US012615475B2

(12) United States Patent
Chen

(10) Patent No.: US 12,615,475 B2
(45) Date of Patent: Apr. 28, 2026

(54) STRUCTURE OF LOUDSPEAKER

(71) Applicant: Wise Thinking Ltd., New Taipei City (TW)

(72) Inventor: Yi-Liang Chen, New Taipei City (TW)

(73) Assignee: WISE THINKING LTD., New Taipei City (TW)

( * ) Notice: Subject to any disclaimer, the term of this patent is extended or adjusted under 35 U.S.C. 154(b) by 281 days.

(21) Appl. No.: 18/510,570

(22) Filed: Nov. 15, 2023

(65) Prior Publication Data

US 2025/0071470 A1 Feb. 27, 2025

(30) Foreign Application Priority Data

Aug. 25, 2023 (TW) ................................ 112132060

(51) Int. Cl.
*H04R 1/28* (2006.01)

(52) U.S. Cl.
CPC ......... *H04R 1/2811* (2013.01); *H04R 1/2803* (2013.01)

(58) Field of Classification Search
CPC .... H04R 1/2803; H04R 1/283; H04R 1/2811; H04R 1/2834; H04R 7/12
USPC .................................. 181/164, 173; 381/423
See application file for complete search history.

(56) References Cited

U.S. PATENT DOCUMENTS 1,653,045 A * 12/1927 Holinger .................. H04R 7/12 181/173
1,690,726 A * 11/1928 Holinger ................ H04R 11/02 181/173
1,895,494 A * 1/1933 Smythe .................... H04R 7/12 181/163
2,233,244 A * 2/1941 Compare ................. H04R 7/12 181/173
3,720,787 A * 3/1973 Ishii ......................... H04R 1/02 381/345
4,139,733 A * 2/1979 Falkenberg .............. H04R 7/12 181/173
4,473,721 A * 9/1984 Klein ..................... H04R 15/00 181/173
4,488,010 A * 12/1984 Klein ....................... H04R 7/12 381/386
4,673,057 A * 6/1987 Glassco ................... H04R 1/40 181/150
4,761,817 A * 8/1988 Christie ................. H04R 7/125 181/167

(Continued)

*Primary Examiner* — Jeremy A Luks

(74) *Attorney, Agent, or Firm* — Birch, Stewart, Kolasch & Birch, LLP

(57) ABSTRACT

A structure includes a sound-generating element, a first combining member, a plurality of second vibration membranes, a plurality of spacing portions, a vibration space, and a sound-absorbing element. Based on the structure, the arrangement of the first and second vibration membranes can enhance musicality of low frequencies of the sound-generating element and can also ensure the clearness of middle and high frequencies to allow most of the hearing impaired to clearly hear, and this, together with the arrangement of a combination curvature and spacing portions, makes the transmission path of sound waves wider and also makes the sound more transmittable, while the sound-absorbing element provides dual functions of noise reduction and supporting to the second vibration membranes.

1 Claim, 23 Drawing Sheets

(56) References Cited

U.S. PATENT DOCUMENTS

| | | | | | |
|---|---|---|---|---|---|
| 4,890,689 | A * | 1/1990 | Smith | H04R 1/403 | 181/150 |
| 5,103,483 | A * | 4/1992 | Klein | H04R 15/00 | 381/430 |
| 5,812,685 | A * | 9/1998 | Fujita | H04R 1/403 | 181/144 |
| 5,889,876 | A * | 3/1999 | Billings | H04R 1/345 | 381/386 |
| 6,009,972 | A * | 1/2000 | Choi | H04R 1/345 | 181/155 |
| 6,785,397 | B2 * | 8/2004 | Arnstein | H04R 7/122 | 181/173 |
| 7,624,839 | B1 * | 12/2009 | Graber | H04R 1/2896 | 381/349 |
| 7,835,536 | B2 * | 11/2010 | Inagaki | H04R 1/025 | 381/386 |
| 8,240,426 | B2 * | 8/2012 | Silver | H04R 7/12 | 181/173 |
| 10,397,696 | B2 * | 8/2019 | Sullivan | H04R 1/345 | |
| 2006/0196723 | A1 * | 9/2006 | White | H04R 23/00 | 181/173 |
| 2012/0281870 | A1 * | 11/2012 | Oxford | H04R 1/00 | 381/423 |

* cited by examiner

STRUCTURE OF LOUDSPEAKER

BACKGROUND OF THE INVENTION

(a) Technical Field of the Invention

The present invention provides a structure of a loudspeaker for all-frequency sound waves of high, middle, and low frequencies and featuring musicality and the rights of the hearing impaired and having a wider sound wave path, better sound transmittability, and a reduced overall size.

(b) Description of the Prior Art

Healing impairment is classified as conductive hearing loss, sensory-neural hearing loss, central hearing loss, and mixed hearing loss, among which the sensory-neural hearing loss occurs in the internal ear or auditory nerve. Reasons that cause neural hearing loss include infection of filterable viruses, therapeutic treatment conducted with ototoxicity medicines, aging, and exposure to noisy environment. That occurring in the internal ear often suffers the loudness recruitment phenomenon, and for hearing impairment of this type, high frequency part is often worse than low frequency part, and thus, vowels of low frequencies can be clearly heard, while consonants of high frequencies are hardly clearly heard (cited from heath education contents of otology of Chang Gung Memorial Hospital, Linkou).

Further, sounds from a known loudspeaker only transmits forwardly, and may at most make the sound wave path changed by means of sound wave reflection, while the nature is not changed at all, and may reversely cause time delay of the normal sound waves and the reflected sound waves, generating unnecessary echo. If multiple loudspeakers are used to create multiple sound wave paths, then the volume and purchase expenditure of the loudspeakers are increased.

However, the above loudspeakers suffer, in the uses thereof, the following problems and deficiency to be alleviated:

Firstly, most are provided for amplification for only the sound waves of middle frequency and high frequency, so that most of the hearing impaired are still incapable of hearing the sound effect of the loudspeaker. If sub-woofers are used, then discomfort may be induced for users having normal hearing capability.

Secondly, surrounding sound effect that has time delay may suffer echo problems, and increasing the number of speakers will result in increases of speaker volume and cost.

Thirdly, it is not possible to integrate a sound wave path of a radiated form in an easy-to-carry loudspeaker, and a loudspeaker having a strong transmission power requires a higher power or a larger size, and is still inconvenient for carrying.

SUMMARY OF THE INVENTION

The primary objective of the present invention is that a sound-generating element is provided with both a first vibration membrane and second vibration membranes to enhance musicality of low frequencies and also to ensure the clearness of middle and high frequencies to allow most of the hearing impaired to clearly hear, and also features an advantage of size reduction. Further, an arrangement of a combination curvature and spacing portions provided on the second vibration membranes makes the transmission path of sound waves wider to realize true surrounding sound effect and also generate superimposition of the sound waves to make the sound more transmittable.

A main structure of the present invention comprises: a sound-generating element, a first vibration membrane, a first combining member, a plurality of second vibration membranes, a combination curvature having multiple sections, a first curvature, at least one second curvature, a third curvature, a plurality of spacing portions, a vibration space, and a sound-absorbing element, wherein the first vibration membrane is arranged on a surface of the sound-generating element, the first combining member being arranged on the sound-generating element and abutting a center of the first vibration membrane, ends of the second vibration membranes being circumferentially arranged on the first combining member, the combination curvature being formed by curving the second vibration membranes, the first curvature being defined on one side of the first combining member, the second curvature being defined on one side of the first curvature that is away from the first combining member, the third curvature being defined on one side of the second curvature that is away from the first curvature, the spacing portions being defined between adjacent ones of the second vibration membranes, the vibration space being formed by being surrounded by curving of the second vibration membranes, the sound-absorbing element being in an interior of the vibration space for noise reduction and supporting of the second vibration membranes.

When a user drives the loudspeaker according to the present invention, the sound-generating element generates, by means of the first vibration membrane, sound waves, wherein a portion of the sound waves regularly transmits forwardly, while the remaining transmits to the second vibration membranes to induce resonance with the vibration space to cause the second vibration membranes to synchronously generate sound waves, and further, the second vibration membranes are circumferentially arranged around the first combining member and exhibit a condition of radially spreading horizontal sound waves, in combination with the arrangement of the combination curvature to change an angle of the sound wave path to make the range of sound wave transmission direction wider, together with the arrangement of the spacing portions to make the sound waves generated by the first vibration membrane, the sound waves generated by the second vibration membranes, and the sound waves transmitting out of the spacing portions superimposed with each other to intensify the sound waves so as to reduce the requirement for speaker size and also enhance music penetrability, and the sound-absorbing element shows dual functions of noise reduction and supporting to the second vibration membranes.

By means of the above technology, the problems existing in the prior art the speaker that lower frequency is not intensified and thus not suitable for the hearing impaired and echo situation for surrounding sound effect and insufficient transmittability of the sound waves and problems of large size and high cost can be overcome to achieve practical improvements for the above advantages.

DETAILED DESCRIPTION OF THE PREFERRED EMBODIMENTS

Figure 1:
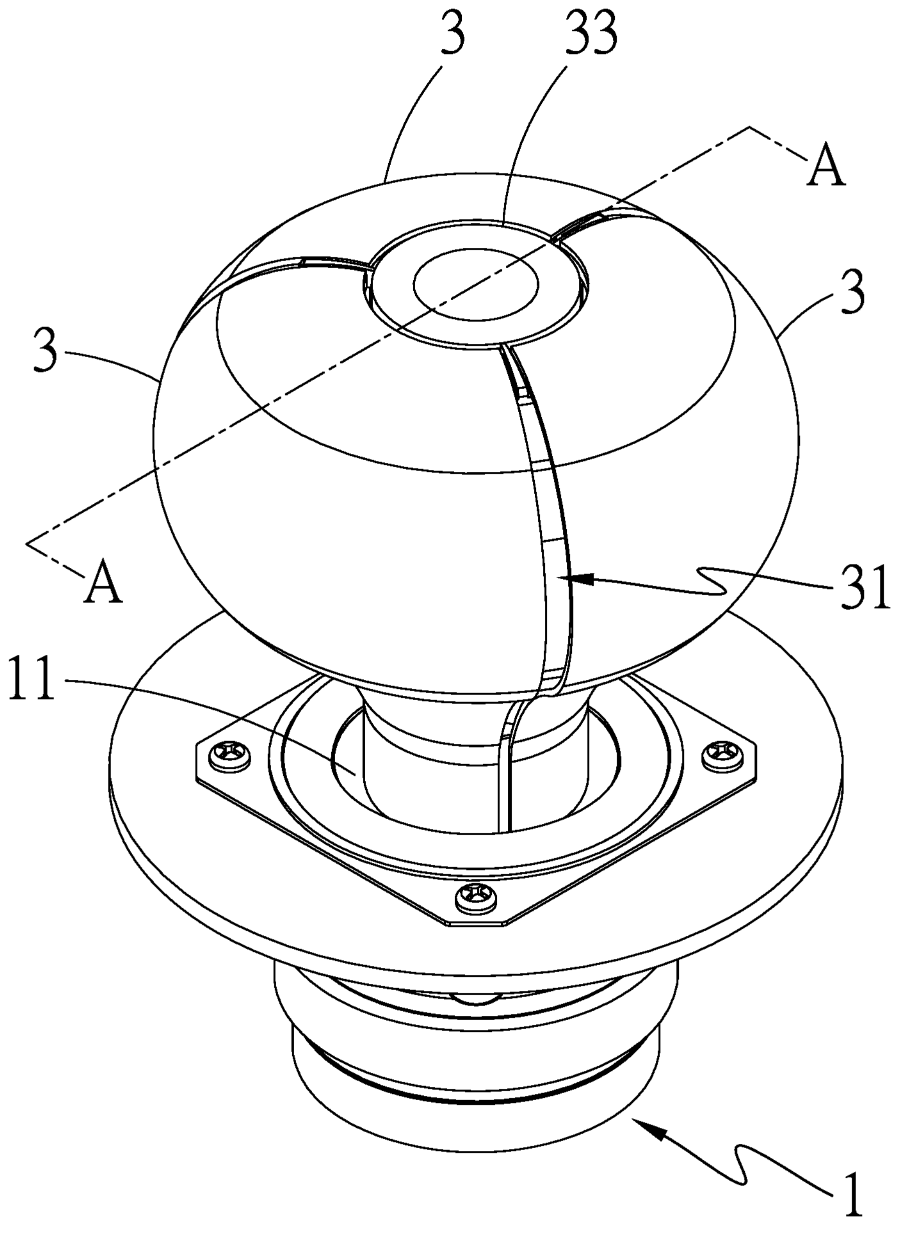
FIG. 1 is a perspective view of a first embodiment of the present invention.
Figure 2:
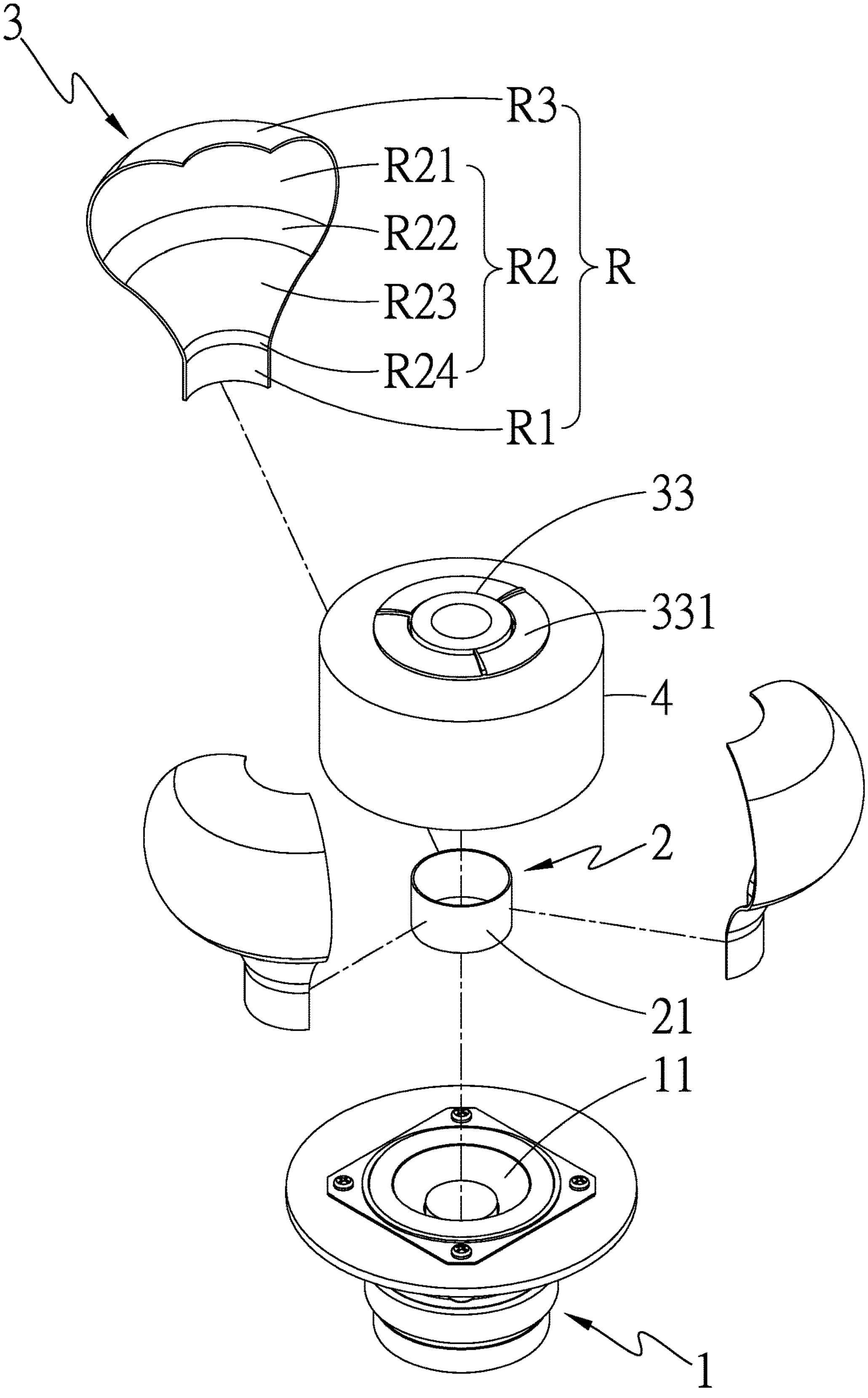
FIG. 2 is an exploded view of the first embodiment of the present invention.
Figure 3:
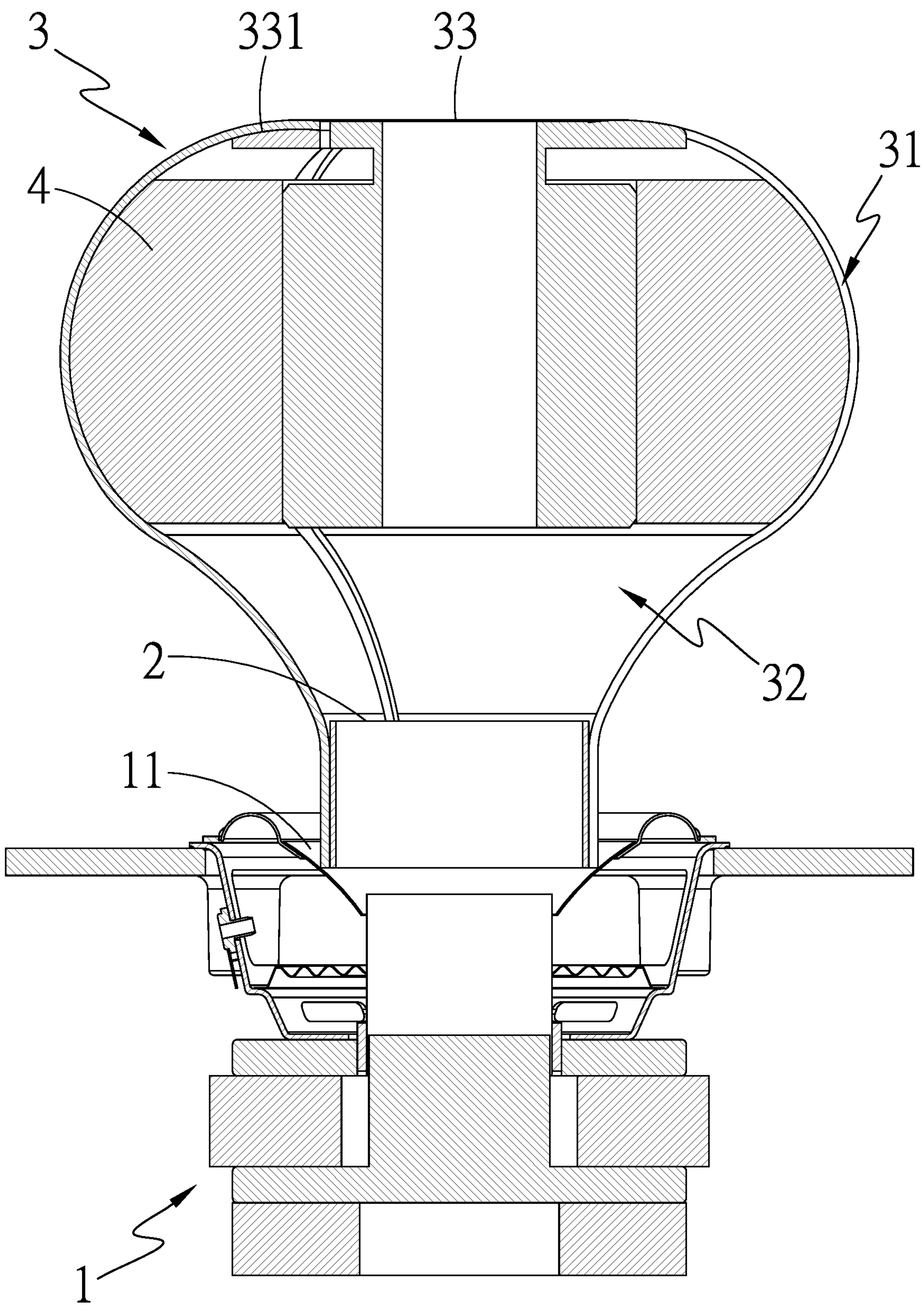
FIG. 3 is a cross-sectional view of the first embodiment of the present invention, taken along line A-A of FIG. 1.

As shown in FIGS. 1-3, it is clearly seen that the present invention comprises:

- a sound-generating element 1, of which a surface comprises a first vibration membrane 11;
- a first combining member 2, which is arranged on the sound-generating element 1 and abuts a center of the first vibration membrane 11, the first combining member 2 comprising at least one combining surface 21;
- a plurality of second vibration membranes 3, ends of the second vibration membranes 3 being circumferentially arranged on the first combining member 2 and correspondingly combined with the combining surface 21, the combining surface 21 and combining portions of the second vibration membranes 3 adjacent thereto being mutually unparallel to each other, each of the second vibration membranes 3 being curved to form multiple sections of a combination curvature R, the combination curvature R including a first curvature R1 adjacent to the first combining member 2, at least one second curvature R2 defined on one side of the first curvature R1 that is away from the first combining member 2, and a third curvature R3 defined on one side of the second curvature R2 that is away from the first curvature R1, so that the second vibration membranes 3 are made in the form of one of water drop, fan blade, and pinwheel, the second curvature R2 of the instant embodiment being formed of four radii of curvature R21, R22, R23, R24;
- a plurality of spacing portions 31, which are defined between adjacent ones of the second vibration membranes 3;
- a vibration space 32, which is formed by being surrounded by curving of the second vibration membranes 3, the vibration space 32 being provided, in an interior thereof, with a second combining member 33, the second combining member 33 comprising plurality of combining curved surfaces 331 for mounting end portions of the second vibration membranes 3 that are away from the first combining member 2; and
- a sound-absorbing element 4, which is arranged in the interior of the vibration space 32 for noise reduction and supporting of the second vibration membranes 3.

The sound-generating element 1 comprises a speaker. The first vibration membrane 11 comprises a thin conic film. The first combining member 2 is made in a ring form. The second vibration membranes 3 comprise low-density polyethylene (PE) foam, and a water drop configuration is taken as an example for illustration in the instant embodiment. The spacing portions 31 are gaps among the second vibration membranes 3. The sound-absorbing element 4 comprises one of polyurethane (PU) foam, polyethylene (PE) foam, fiberglass cotton, or a rock wool material. However, the configurations corresponding to the above elements are provided as a preferred embodiment for illustration, and all configurations possessing the same functionality are considered falling in the scope of the present invention, not limited to what illustrated above.

Figure 4:
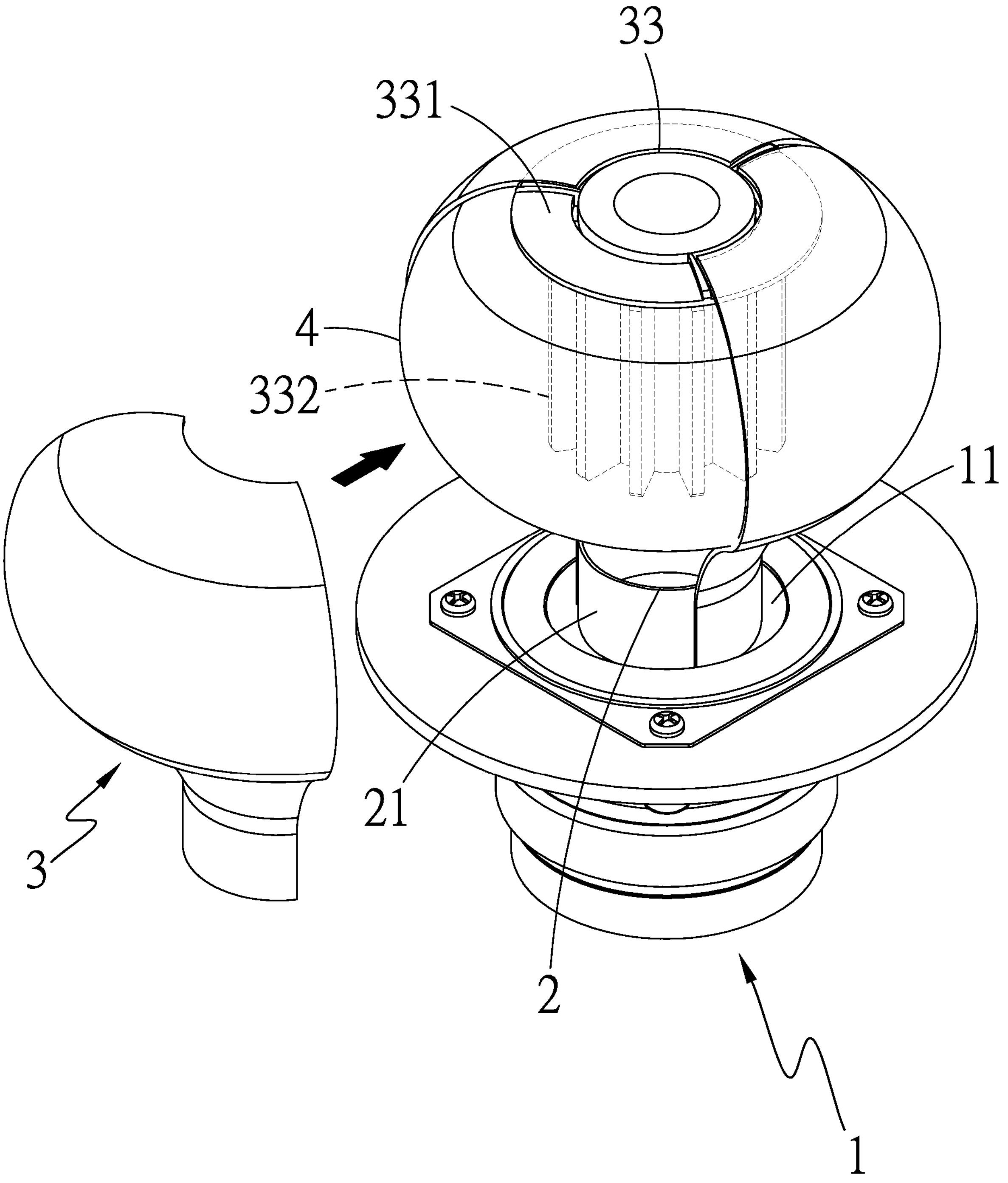
FIG. 4 is a schematic view illustrating combining of a vibration membrane of the first embodiment of the present invention.

As shown in FIGS. 1-6, the above components are assembled such that, reference also made to FIGS. 2-4, the sound-generating element 1 is a speaker that comprises the first vibration membrane 11 of a conic configuration, and the present invention provides the second vibration membranes 3 that are arranged at one side of the first vibration membrane 11, and the arrangement is achieved with the first combining member 2, where the first combining member 2 can be a ring, or one of a dust protection cover or a voice coil of the sound-generating element 1, where a ring is taken as an example for illustration in the instant embodiment, so that the first combining member 2 is bonded and fixed to the center of the first vibration membrane 11 to serve a transmission medium between the first vibration membrane 11 and the second vibration membranes 3, and the outside surface of the first combining member 2 is the combining surface 21 in an annular form to allow the second vibration membranes 3 to directly bond to the combining surface 21 for combination, and then, the second vibration membranes 3 that are designed to includes the combination curvature R jointly form, through surrounding, a configuration of water drop, while the other ends of the second vibration membranes 3 are bonded to the combining curved surfaces 331 of the second combining member 33, where the second combining member 33 can be of a configuration of a circular plate or a hollow circular barrel form, and for the configuration of a circular plate, it provides only the plurality of combining curved surfaces 331 to receive the second vibration membranes 3 to bond thereto to make the vibration space 32 in the second vibration membranes 3 maximized, but for supporting the combination curvature R of the second vibration membranes 3, there must be a measure for such supporting, and the instant embodiment uses the sound-absorbing element 4 that has a function of eliminating high-frequency noise to fill in the vibration space 32 for supporting, making it exhibiting dual functions, and for the hollow circular barrel form, the barrel may be further provided with a support frame 332 to allow the sound-absorbing element 4 to fix to the support frame 332 so as to constrain the sound-absorbing element 4, in position, on the second curvature R2 to provide supporting of a maximum extent and also to reduce an amount of use of the sound-absorbing element 4 to lower down the material cost.

Figure 5:
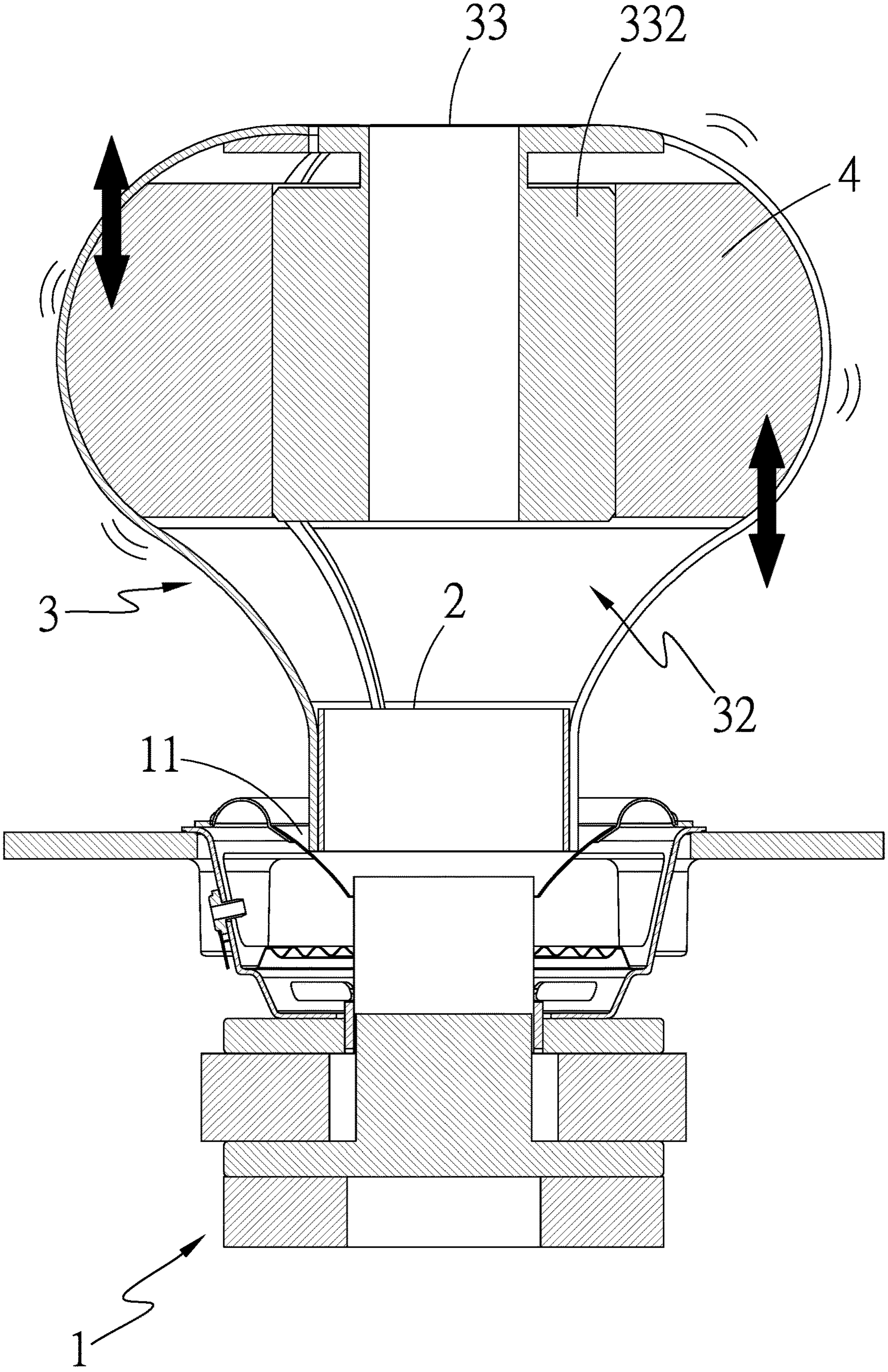
FIG. 5 is a schematic view illustrating sound-generating vibration of the first embodiment of the present invention.
Figure 6:
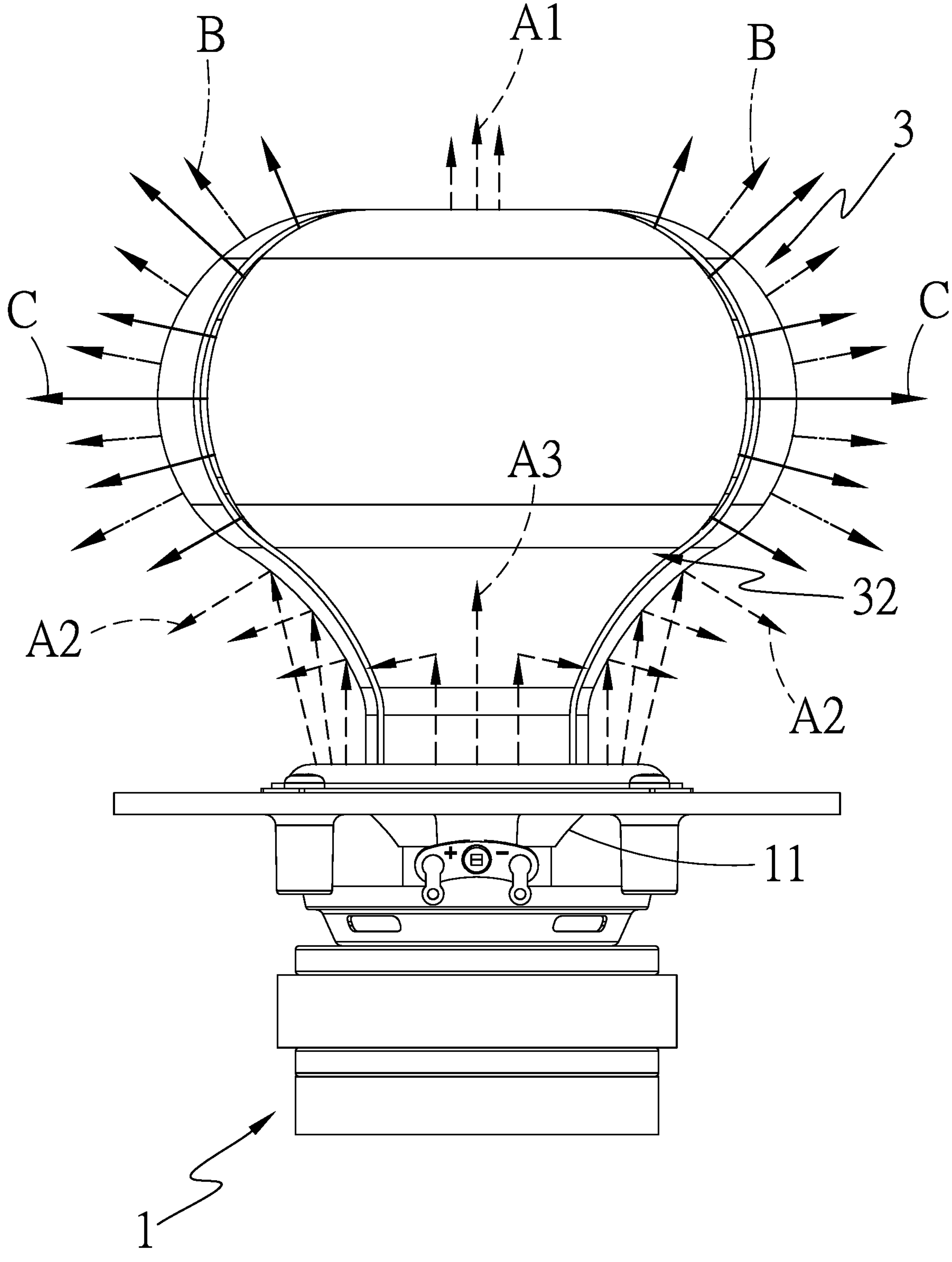
FIG. 6 is a schematic view illustrating a sound wave path of the first embodiment of the present invention.

As shown in FIGS. 2 and 5-6, in practical uses, the sound-generating element 1 generates, by means of the first vibration membrane 11, sound waves, and a minor portion of the sound waves regularly transmits forwardly to pass through the vibration space 32 to further travel forwardly (as shown by phantom arrows A1) and a minor portion of the sound waves hits the second vibration membranes 3 and travels sideways toward the rear side (as indicated by phantom arrows A2), while the remaining portion of the sound waves transmits to the second vibration membranes 3 and the vibration space 32 (as indicated by phantom arrow A3), and the portion that transmits to the second vibration membranes 3 causes the second vibration membranes 3 to move in upward and downward directions and thus locate, in a movable manner, above the sound-generating element 1, and to thereby resonate, due to minor deformation resulting from the nature of the material thereof, with the vibration space 32, making the second vibration membranes 3 synchronously generating sound waves, and further, the second vibration membranes 3 are circumferentially arranged around the first combining member 2 and exhibit a condition of radially spreading horizontal sound waves, and this, together with the vibration of the second vibration membranes 3, in the entirety thereof, makes sound waves transmitting outward at different directions in every second so that the sound can be transmitted to everywhere in the space to fill up the entire environment.

The angle of the sound wave path can be varied based on the multiple-section arrangement of the combination curvature R, so that the range of transmission direction of the sound waves is made wider (as indicated by dash-dot arrows B), and specifically, the first curvature R1 is the part of the second vibration membranes 3 that is bonded to the first combining member 2; the third curvature R3 is part of the second vibration membranes 3 is attached to the second combining member 33; and the second curvature R2 is the middle part between the first curvature R1 and the third curvature R3, and in the instant embodiment, the radii of curvature of the first curvature R1 and the third curvature R3 are of fixed curvature, and the second curvature R2 is formed of a plurality of curves, which, in the instant embodiment, include fixed curvatures of a radius of curvature R21, a radius of curvature R22, and a radius of curvature R24, and a gradually-varying curvature of a radius of curvature R23. The combination curvature R is only provided as an example of illustration for the preferred embodiment, and customized adjustment may be made, based on the user's demand for sound quality, or based on the situation of the hearing impaired for effective sound frequency, to generate sound waves of various frequencies. The effective sound frequency used herein indicates the range of frequency of sound waves that most of the hearing impaired may hear.

Further, due to the arrangement of the spacing portions 31, the sound waves transmitted from the first vibration membrane 11 into the vibration space 32 may have a portion travelling out of the second vibration membranes 3 by penetrating through the spacing portions 31 (as indicated by solid arrows C), so that the sound waves generated by the first vibration membrane 11, the sound waves generated by the second vibration membranes 3, and the sound waves penetrating through the spacing portions 31 may superimpose with each other to intensify the sound waves so as to enhance music penetrability, and the requirement for the size of the speaker can also be reduced due to the intensification of the sound waves.

Figure 7:
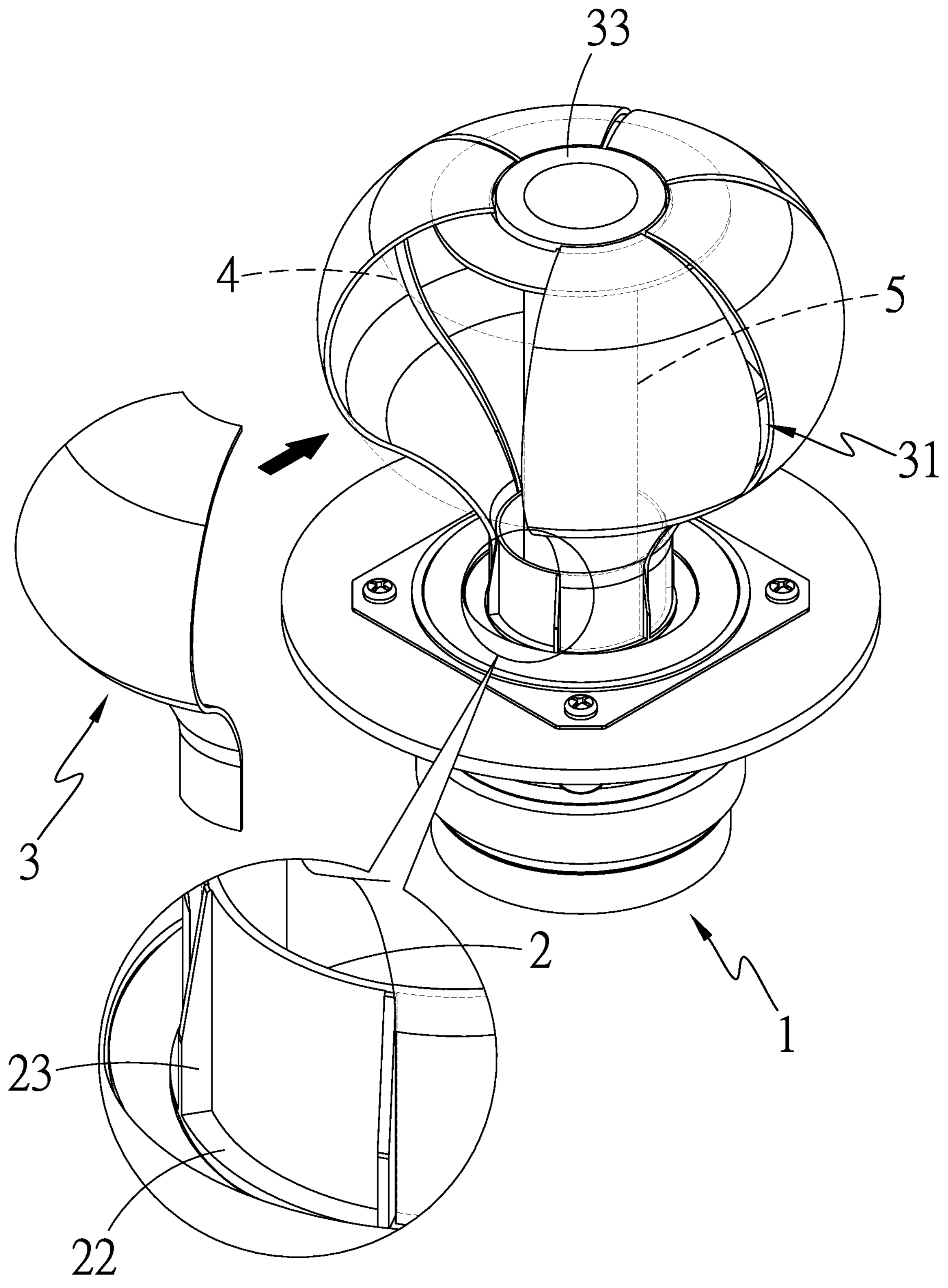
FIG. 7 is a schematic view illustrating assembling of a second embodiment of the present invention.

As shown in FIG. 7, the instant embodiment only increases the number of the second vibration membranes 3 to six, and thus, the number of the spacing portions 31 is correspondingly increased to six, and the sound-generating element 1 is provided with a support element 5 that extends through the vibration space, and one end of the support element 5 that is away from the sound-generating element 1 is arranged for mounting the ends of the second vibration membranes 3 that are away from the first combining member 2, and one end of the first combining member 2 is provided with a stop portion 22 for constraining the second vibration membranes 3, and the first combining member 2 is provided with a plurality of limiting portions 23 for fixing and holding the spacing distance of each of the second vibration membranes 3. The support element 5 is directly inserted into the sound-generating element 1, so as to more effectively provide a supporting effect to the combination curvature of the second vibration membranes 3 and also to reduce the loading of the sound-absorbing element 4 for supporting to prevent deterioration of sound. At this moment, the first combining member 2 and the second combining member 33 are respectively fit to two ends of the support element 5, and the six second vibration membranes 3 may simply use the limiting portions 23 to determine the bonding positions thereof when being bonded to the first combining member 2 to ensure each of the spacing portions 31 being identical, while the stop portion 22 is directly set in contact with end surfaces of the second vibration membranes 3 to prevent situations of positional shifting and shape changing of the second vibration membranes 3 due to the upward and downward movements.

Figure 8:
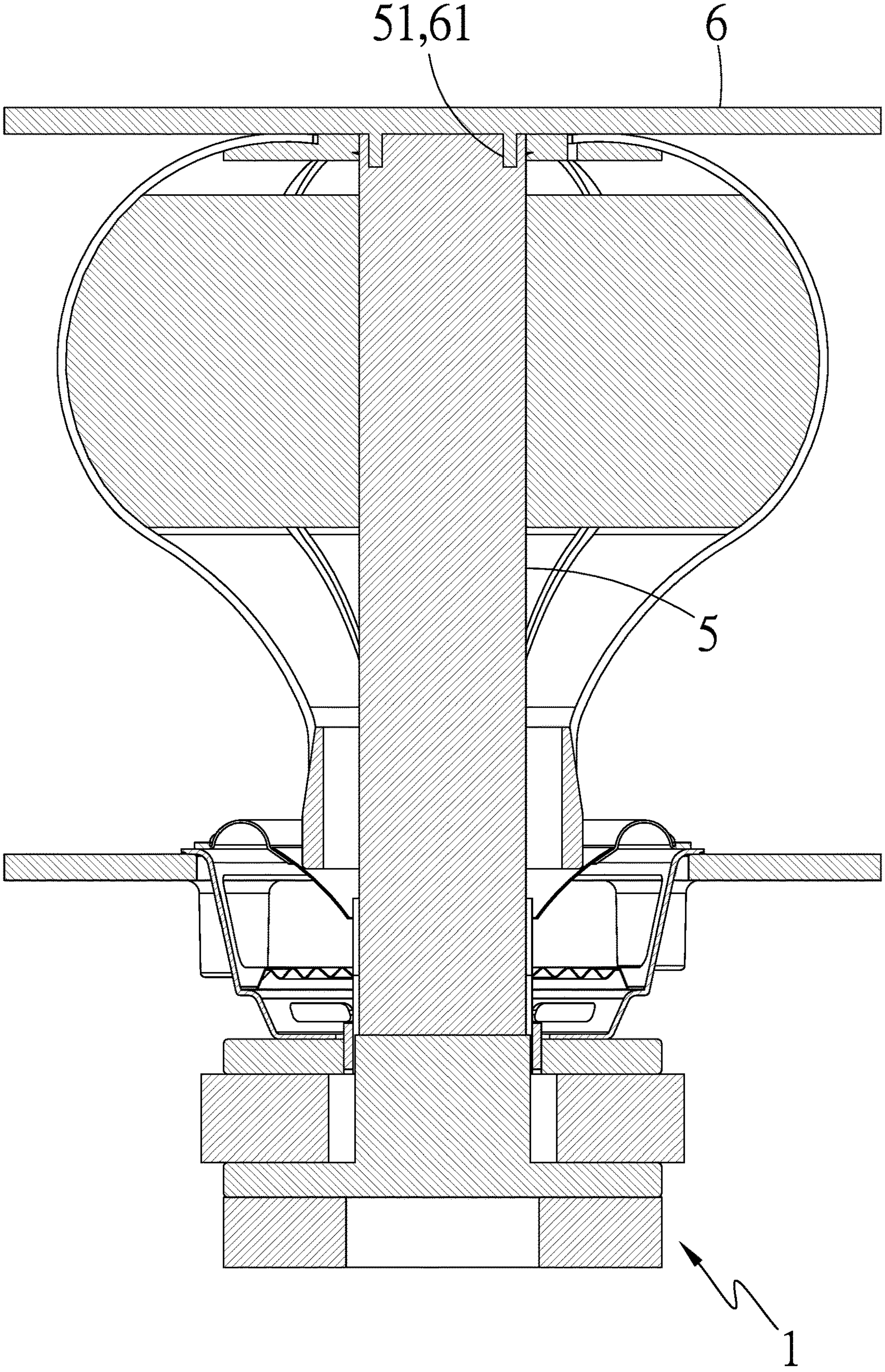
FIG. 8 is a cross-sectional view of a third embodiment of the present invention.
Figure 9:
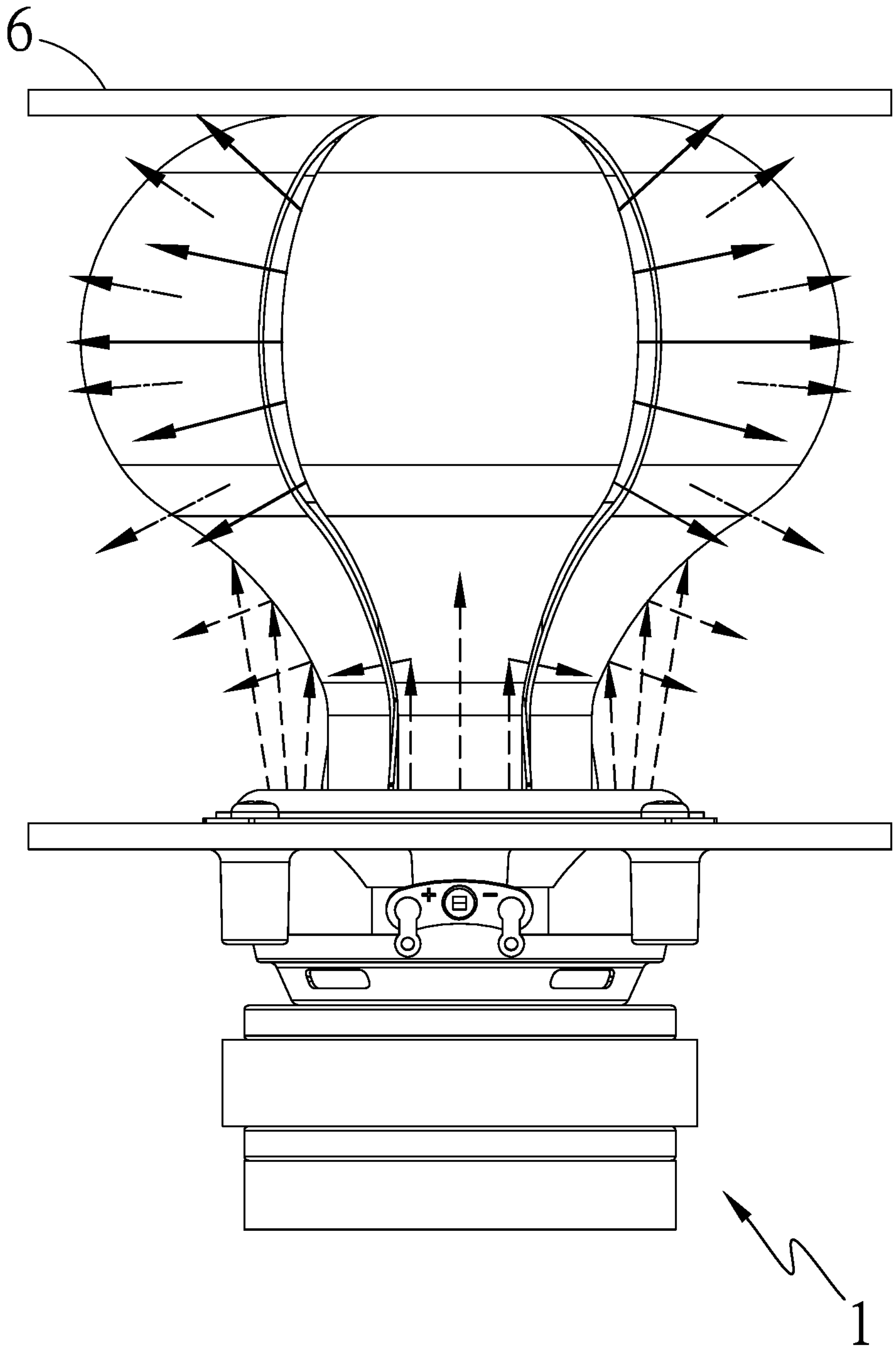
FIG. 9 is a schematic view illustrating a sound wave path of the third embodiment of the present invention.

As shown in FIGS. 8-9, the instant embodiment only arranges a shielding member 6 on one end of the support element 5 that is away from the sound-generating element 1, and the support element 5 may be a hollow cylindrical post or may include a retention groove 51 retention groove formed in a top thereof to receive a projection block 61 on an inside surface of the shielding member 6 to interference-fit therein. The shielding member 6 functions to shield a path for sound waves transmitting upward, so as to have the sound of the sound-generating element 1 only preserve the portion of horizontally radiating. This arrangement prevents undesired echo or noises resulting from the upward-transmitting sound waves reflected by a ceiling, making the present invention more suitable for use in an indoor environment.

Figure 10:
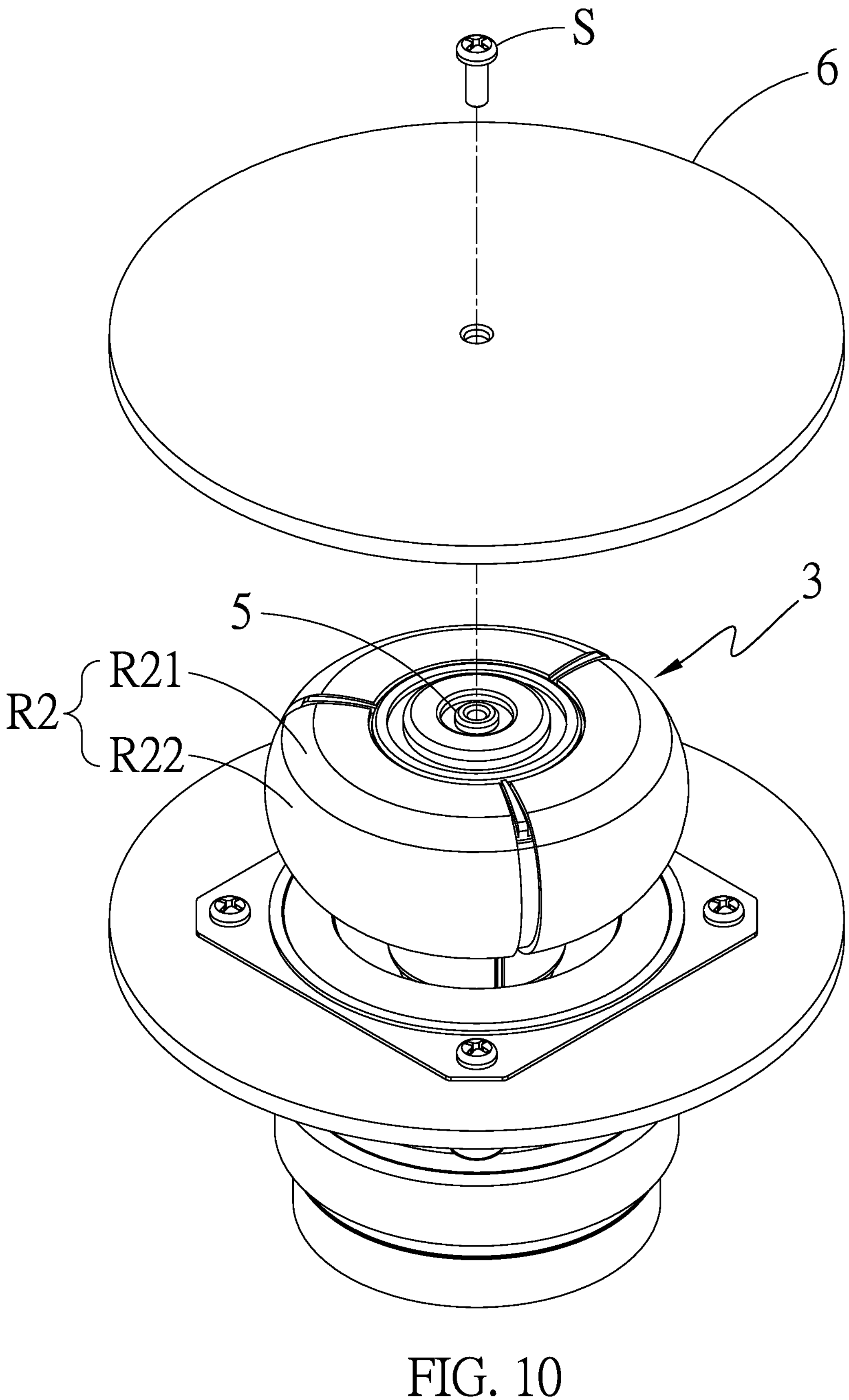
FIG. 10 is an exploded view of a fourth embodiment of the present invention.

As shown in FIG. 10, the instant embodiment only changes the value of the combination curvature of the second vibration membranes 3, and particularly, adjusting is made on the second curvature R2 to make it only include the radius of curvature R21 and the radius of curvature R22, while the outside configuration of the entirety is made even more reduced to better facilitate personally carrying, and the way of combining the shielding member 6 with the support element 5 is changed to one that uses a bolt S to fasten to further enhance the combination strength. However, fastening with a bolt S is only provided as illustration of the preferred embodiment, and may alternatively be pin jointing, fitting, adhering, fusing, or tightening, and no limit is imposed for this.

Figure 11:
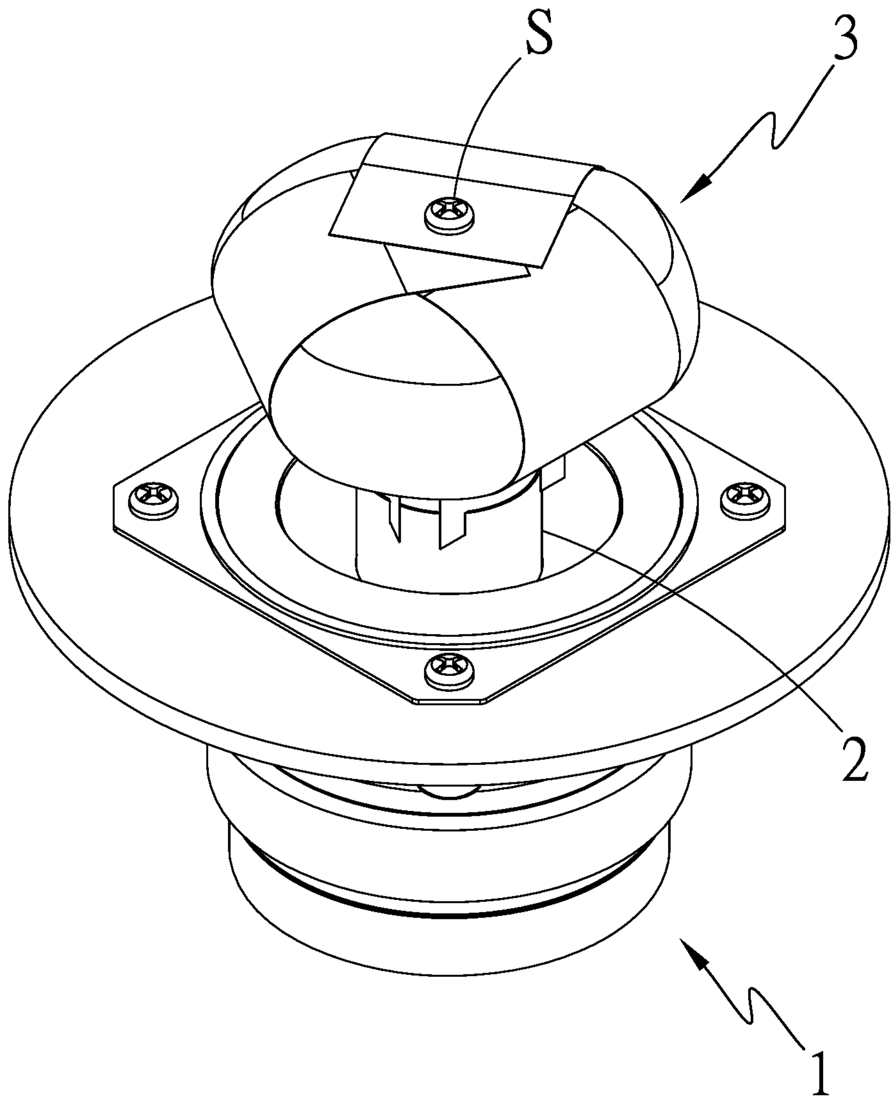
FIG. 11 is a perspective view of a fifth embodiment of the present invention.
Figure 12:
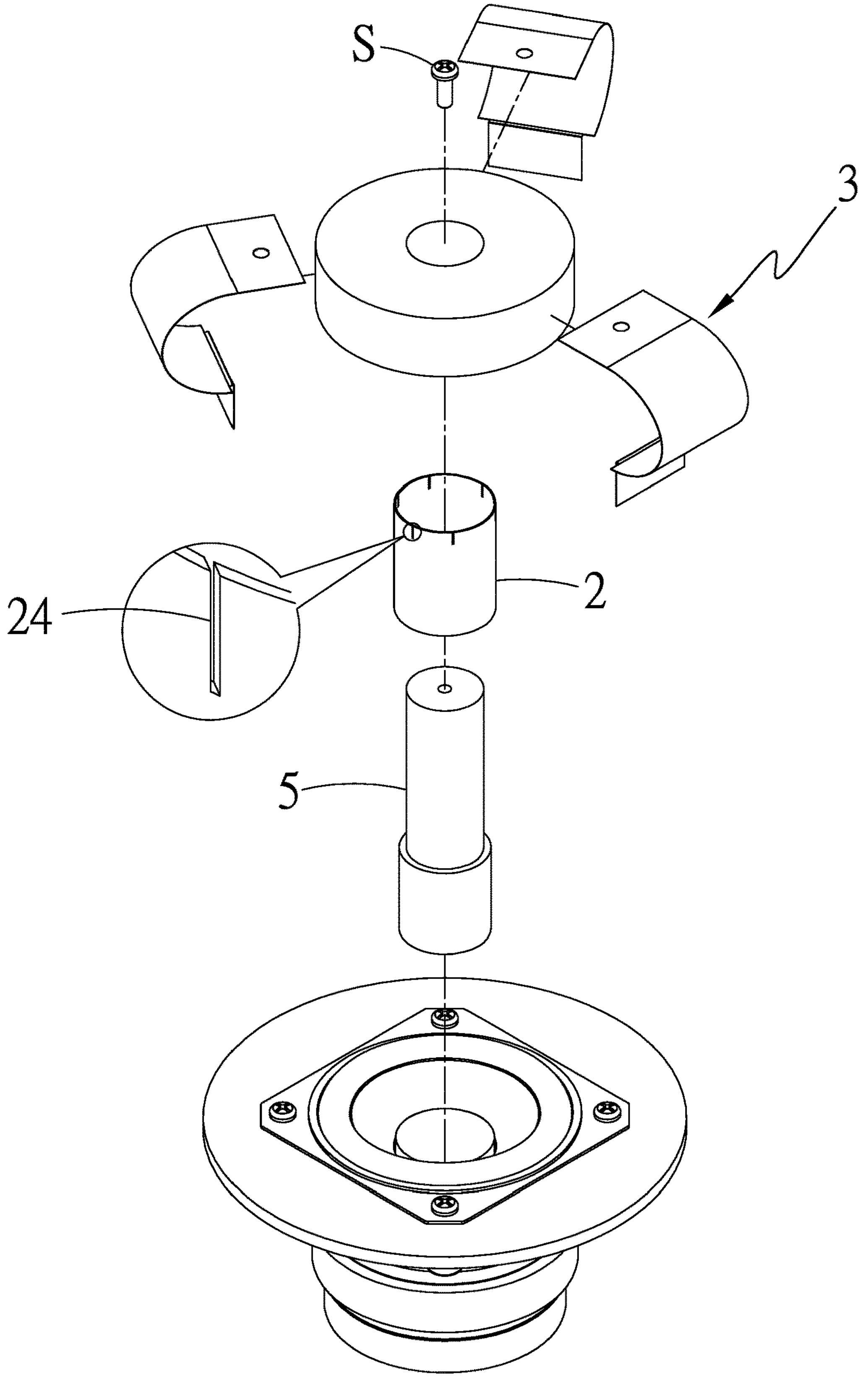
FIG. 12 is an exploded view of the fifth embodiment of the present invention.
Figure 13:
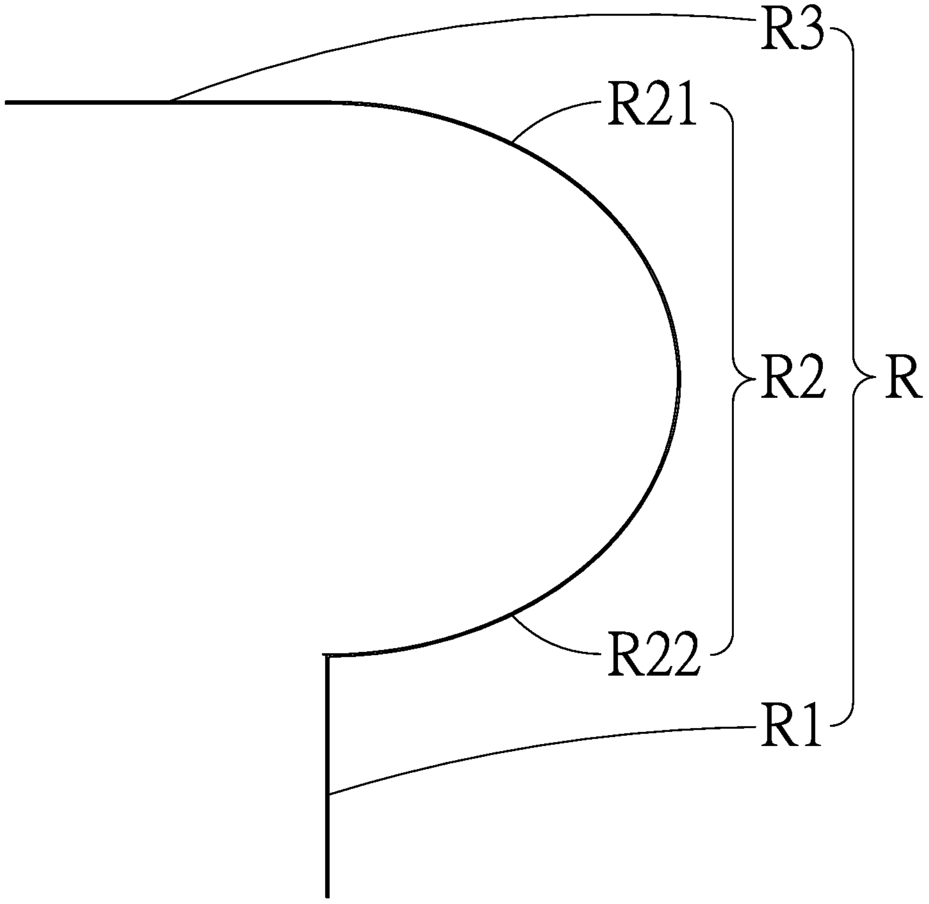
FIG. 13 is a schematic view illustrating curvatures of the fifth embodiment of the present invention.

As shown in FIGS. 11-13, a major difference of the instant embodiment is that the second vibration membranes 3 is changed to a configuration of a pinwheel, and the first combining member 2 is changed to a voice coil of the sound-generating element 1, meaning the second vibration membranes 3 is directly integrated with the voice coil, wherein the number of the second vibration membranes 3 is three and the first combining member 2 is formed with a plurality of linear openings 24 for receiving the second vibration membranes 3 to fit therein and fixed thereto, and every two of the linear openings 24 defines a virtual combining surface, so that when it is combined with the second vibration membranes 3, the adjacent combining surfaces are set in a non-parallel condition, and further, top ends of the second vibration membranes 3 are laminated on a top surface of the support element 5 and a bolt S or other fastening means is directly applied to penetrate all of the second vibration membranes 3 to fasten and fix to the support element 5. Further, for the pinwheel configuration of the second vibration membranes 3, the combination curvature R is also different, and in the instant embodiment, the radii of curvature of the first curvature R1 and the third curvature R3 are 0, while the second curvature R2 is still formed of a plurality of curvatures and the radius of curvature R21 and the radius of curvature R22 are changed to a gradually varying fashion.

Figure 14:
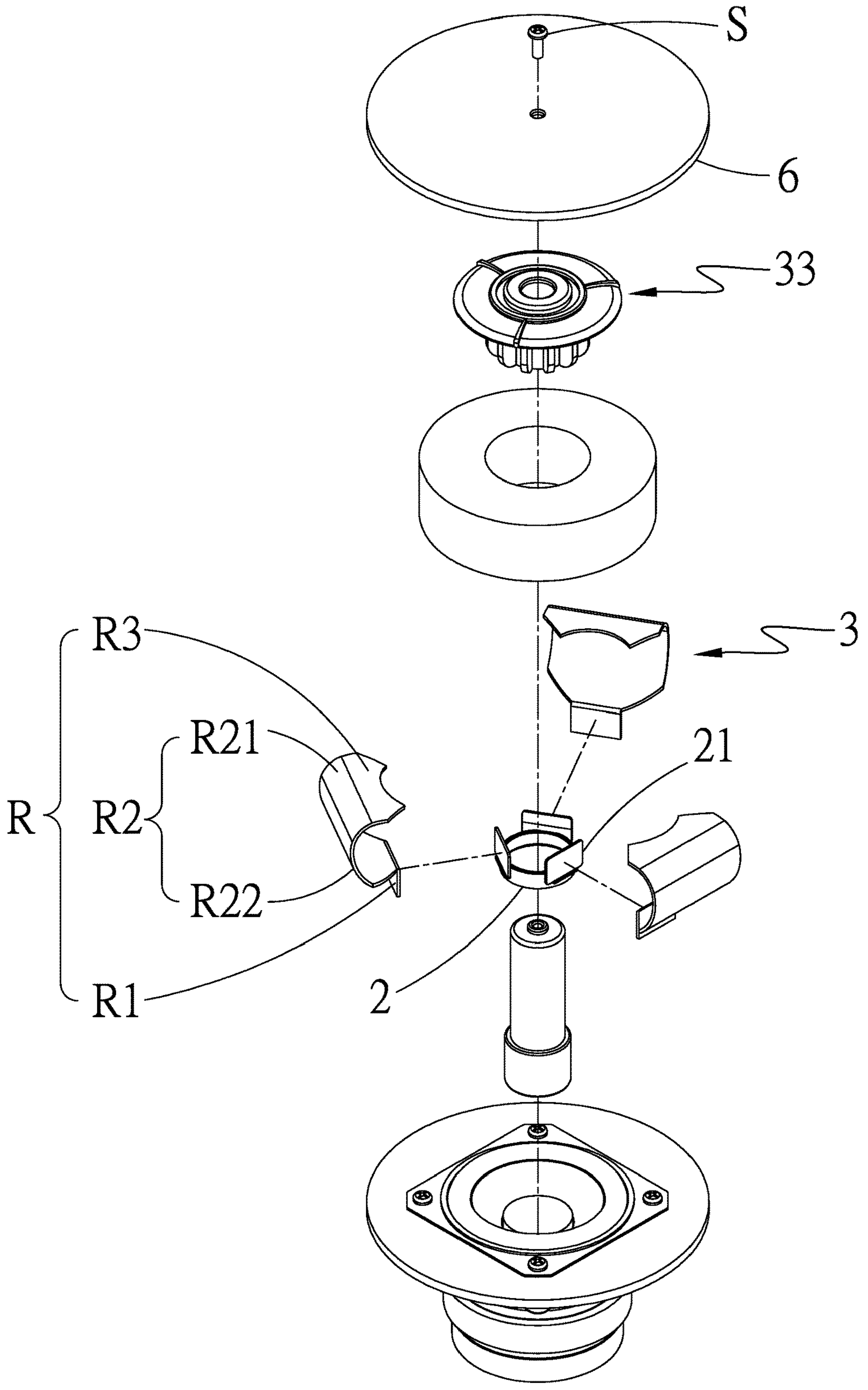
FIG. 14 is an exploded view of a sixth embodiment of the present invention.
Figure 15:
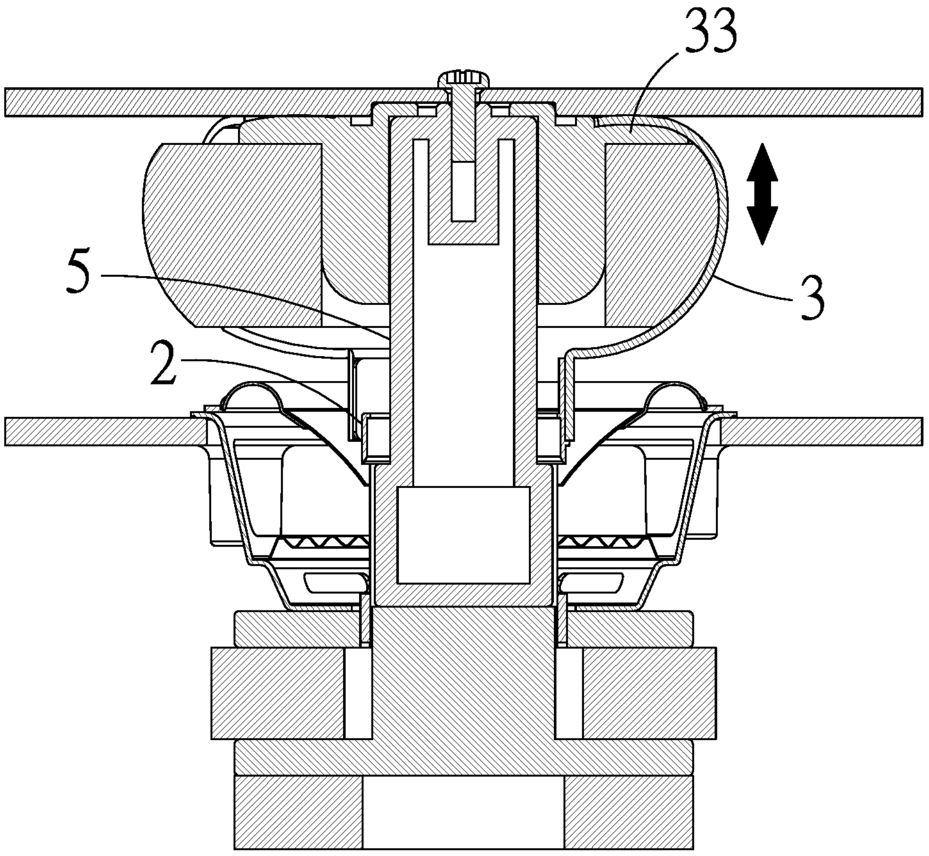
FIG. 15 is a schematic view illustrating implementation of the sixth embodiment of the present invention.
Figure 16:
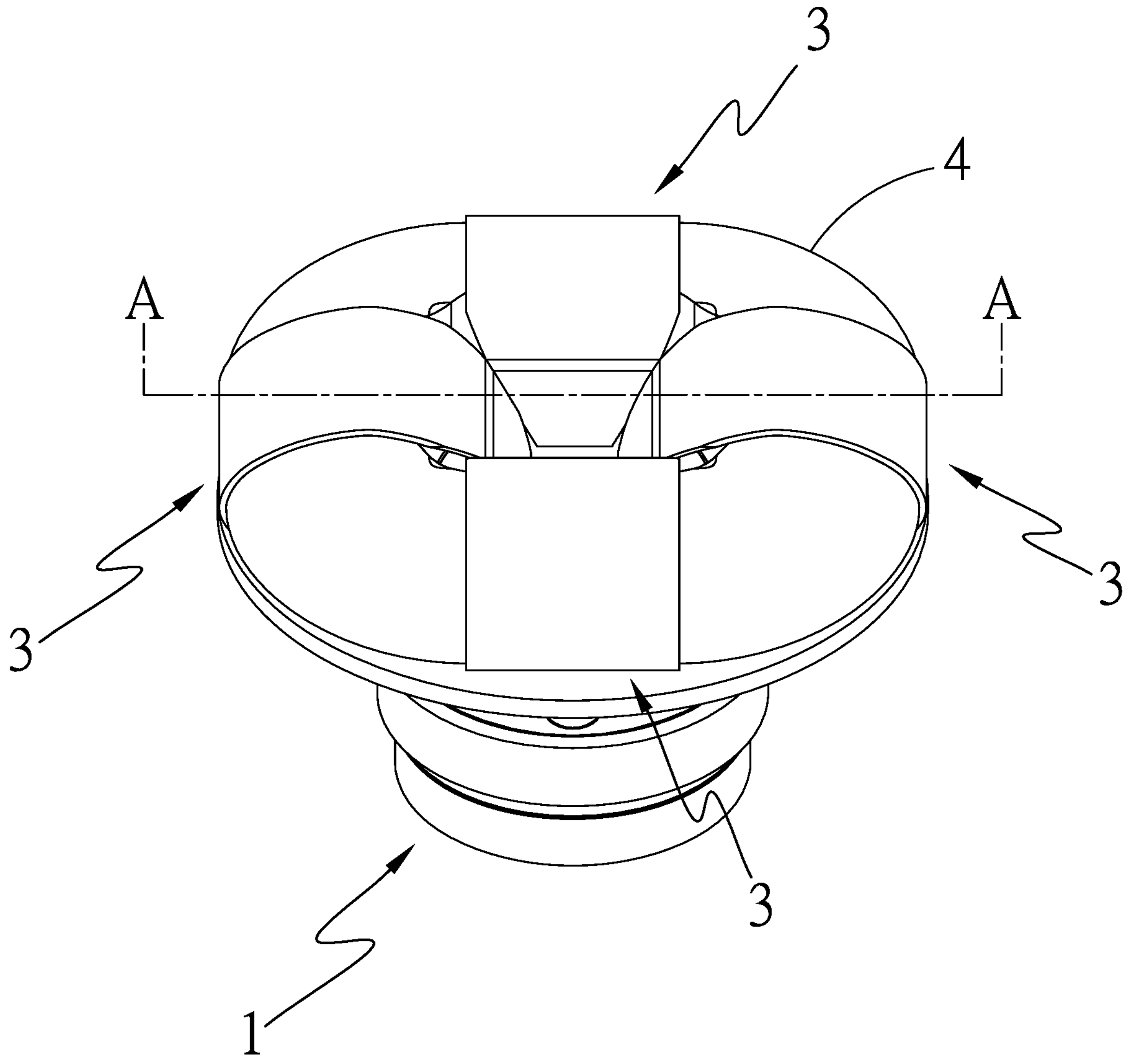
FIG. 16 is a perspective view of a seventh embodiment of the present invention.
Figure 17:
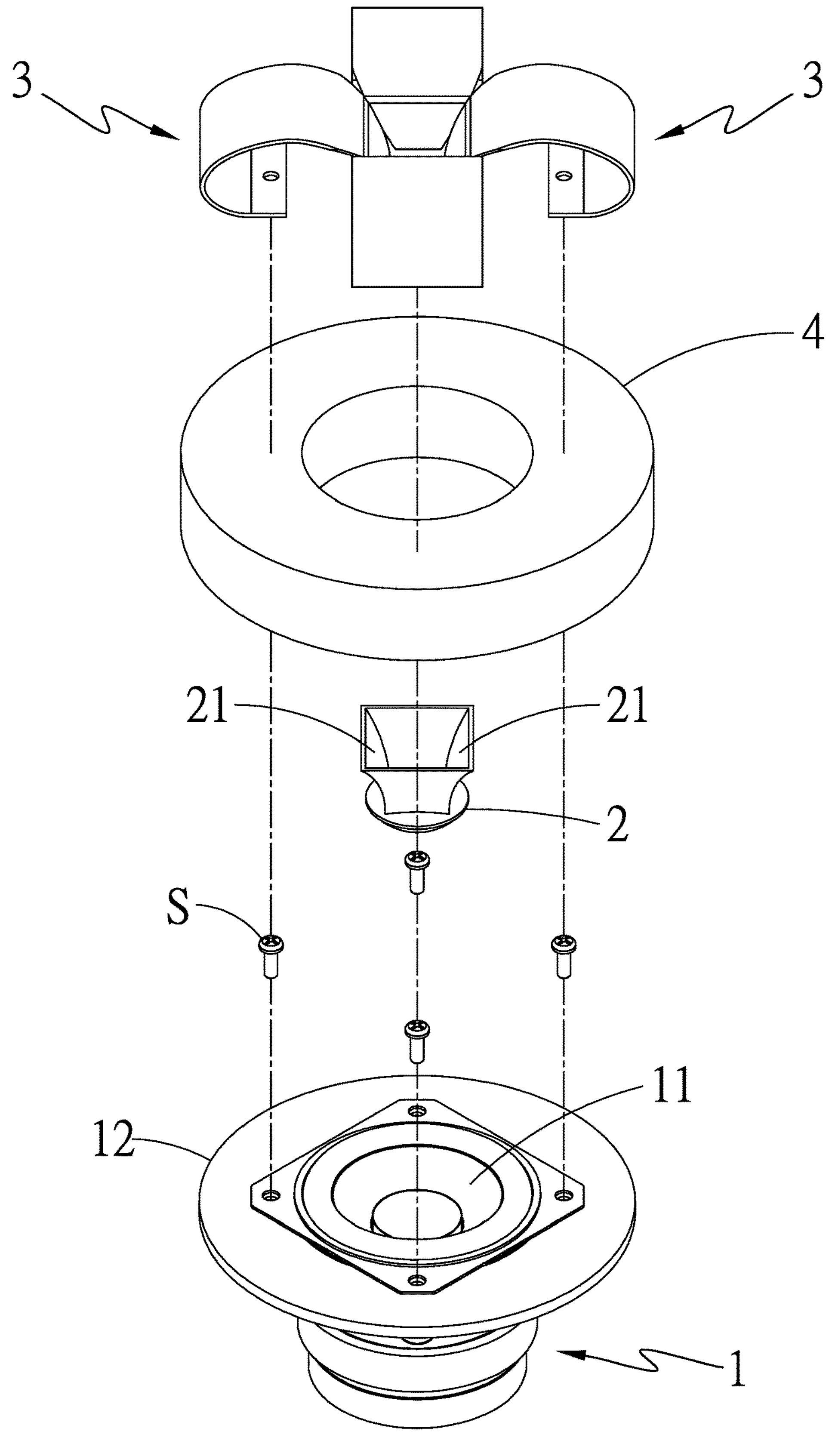
FIG. 17 is an exploded view of the seventh embodiment of the present invention.
Figure 18:
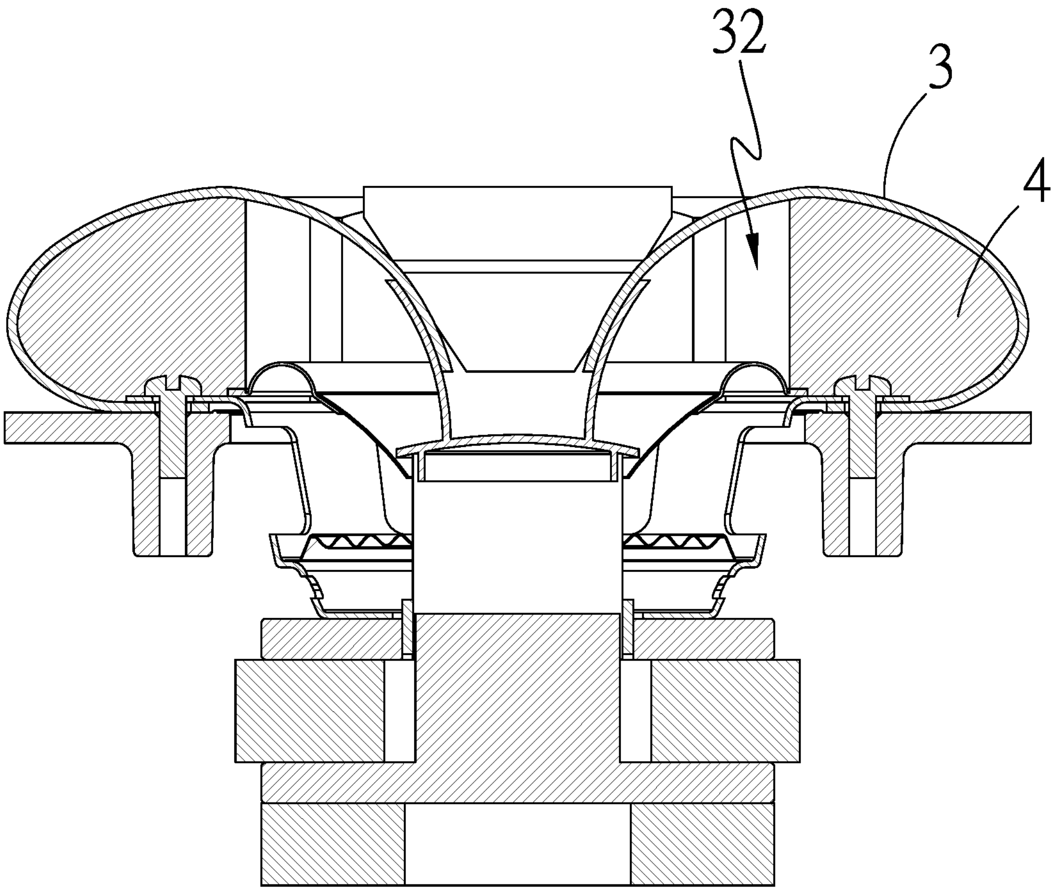
FIG. 18 is a cross-sectional view of the seventh embodiment of the present invention, taken along line A-A of FIG. 16.
Figure 19:
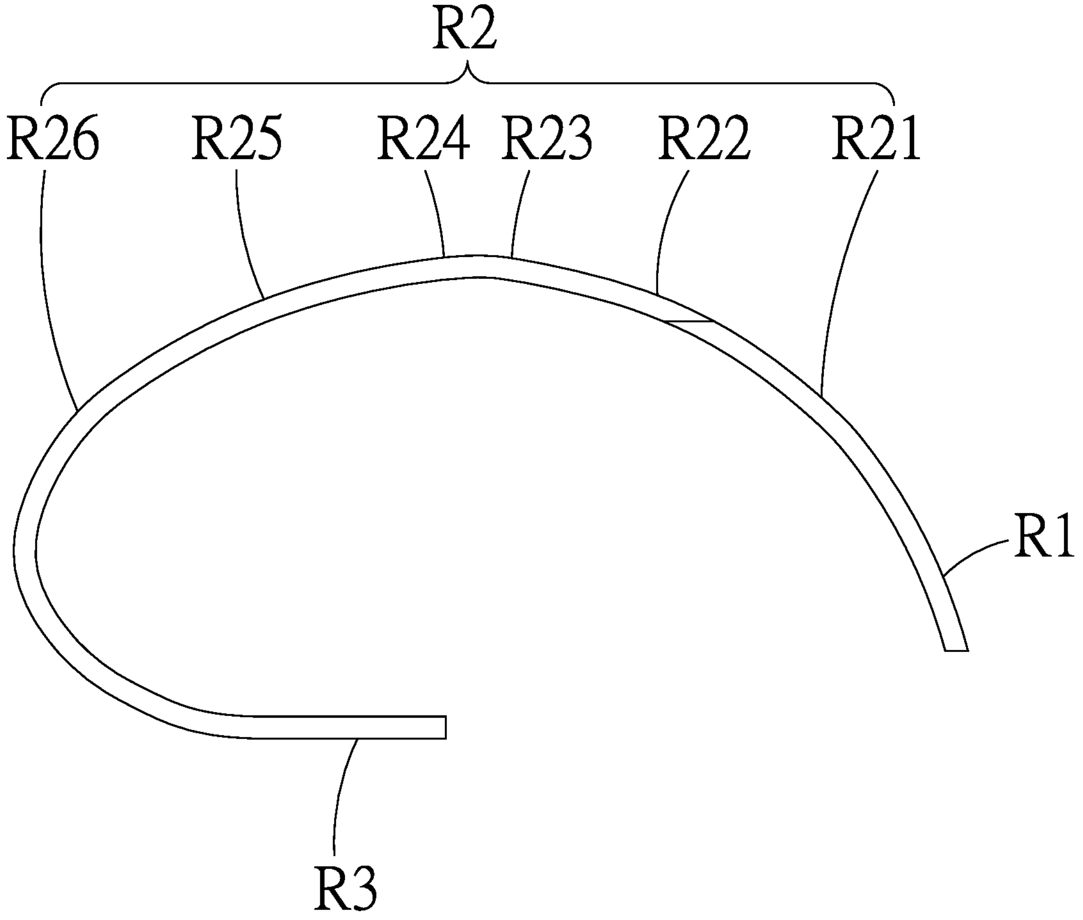
FIG. 19 is a schematic view illustrating curvatures of the seventh embodiment of the present invention.

As shown in FIGS. 14-15, the instant embodiment on changes the value of the combination curvature R of the second vibration membranes 3 and also make the outside shape of the entirety more reduced to facility personally carrying, and the second vibration membranes 3 are modified to be bonded to the second combining member 33, in combination with a bolt S or other fastening means being applied to fix the shielding member 6, so as to simplify the assembling operation and enhance the combination strength. Specifically, in the instant embodiment, the second vibration membranes 3 are also in a configuration of a pinwheel, but the combination curvature R thereof is different, wherein the radius of curvature of the first curvature R1 is 0; the radius of curvature of the third curvature R3 is of a fixed curvature; and the second curvature R2 is still formed of a plurality of curvatures and the radius of curvature R21 and the radius of curvature R22 are changed to fixed curvatures. Further, the first combining member 2 with which the second vibration membranes 3 are combined is still a voice coil, but the position of combination is a combining surface 21 defined by a plate that extends upward from the first combining member 2, and as such, without influencing the effect of the voice coil, the second vibration membranes 3 can be directly combined with the first combining member 2.

As shown in FIGS. 16-19, a major difference of the instant embodiment is that the second vibration membranes 3 is changed to a configuration of a fan blade, and the first combining member 2 is changed to a dust protection cover of the sound-generating element 1, meaning the second vibration membranes 3 is directly combined with the dust protection cover, wherein the number of the second vibration membranes 3 is four, and the first combining member 2 is thus integrally formed with four combining surfaces 21, and opposite ends of the second vibration membranes 3 are combined with the sound-generating element 1, so that the sound-generating element 1 is provided with a frame portion 12, and the first vibration membrane 11 is arranged in an interior of the frame portion 12, and ends of the second vibration membranes 3 that are away from the first combining member 2 are arranged on the frame portion 12, and specifically, the sound-generating element 1 is fastened by bolts S to the frame portion 12, and the second vibration membranes 3 are also use the bolts S to jointly fasten to the frame portion 12 (fastening with the bolts S being only illustration of the preferred embodiment, and pin jointing, fitting, adhering, fusing, or tightening being alternatively applicable, no limit being imposed for this), so that the second vibration membranes 3 form four independent plate that are curved outward to each form a vibration space 32, and the sound-absorbing element 4 is circumferentially arranged to connect serially in the vibration space 32, and as such, the transmission path of the sound waves of the second vibration membranes 3 can be focused on upward transmission. In the instant embodiment, the second vibration membranes 3 are of a configuration of a fan blade, but the combination curvature is different, wherein the radius of curvature of the first curvature R1 is of a fixed curvature; the radius of curvature of the third curvature R3 is 0; the second curvature R2 is formed of a larger number of irregularly varying radii of curvature, for example a radius of curvature R21, a radius of curvature R22, a radius of curvature R23, a radius of curvature R24, a radius of curvature R25, and a radius of curvature R26 being included, having curvatures of identical or different values, and so on.

Figure 20:
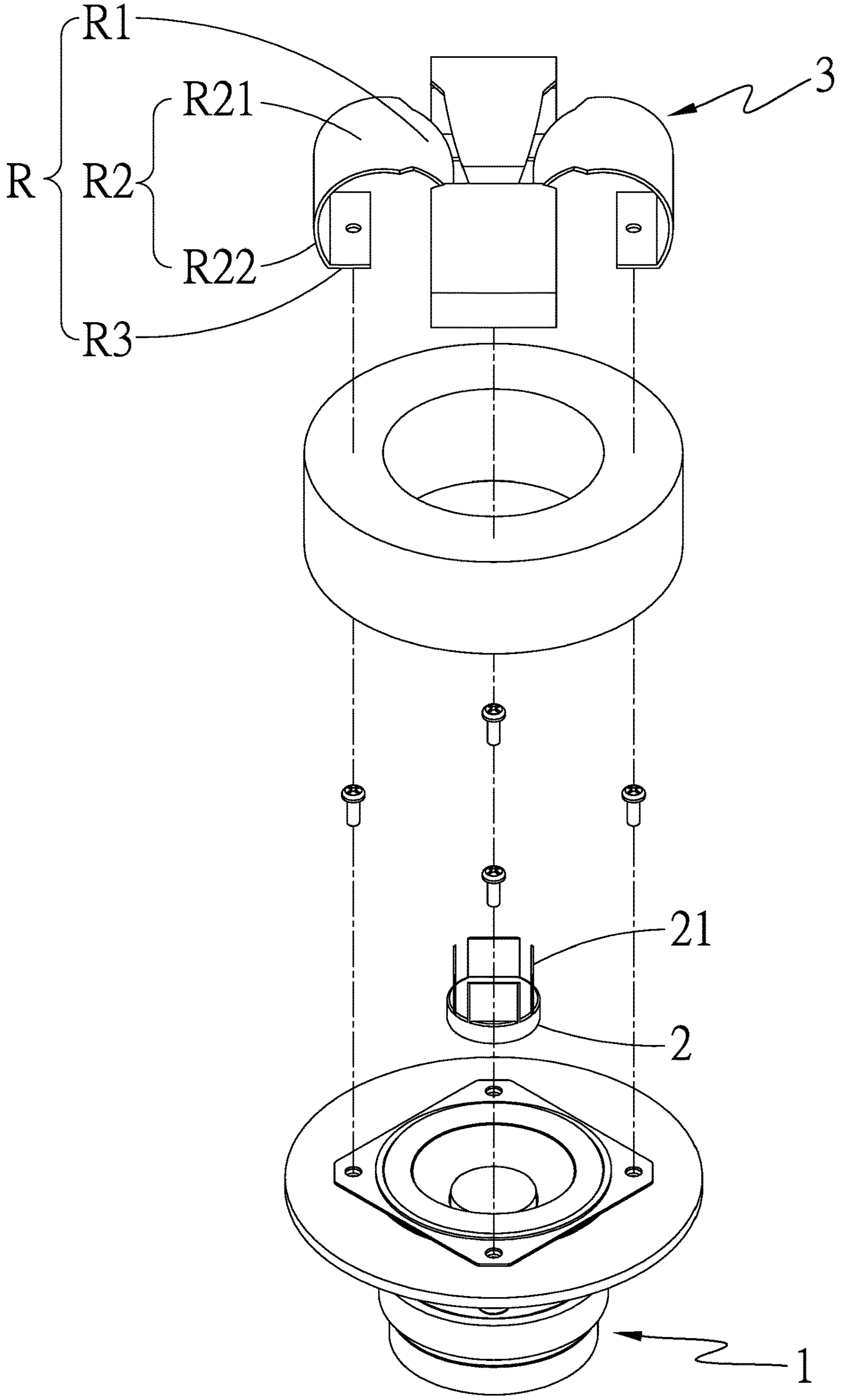
FIG. 20 is an exploded view of an eighth embodiment of the present invention.

As shown in FIG. 20, the instant embodiment is similar to the previous embodiment and a major difference is changing the value of the combination curvature R of the second vibration membranes 3 and changing the first combining member 2 to a voice coil, while the second vibration membranes 3 are similarly combined with four combining surfaces 21 extending from the first combining member 2, this being provided for illustrating that the second vibration membranes 3 of a configuration of a fan blade can also be directly combinable with the voice coil of the sound-generating element 1, and further, in the instant embodiment, the combination curvature R of the second vibration membranes 3 can also be different, wherein the radius of curvature of the first curvature R1 is a fixed curvature; the radius of curvature of the third curvature R3 is approximately 0; and the second curvature R2 is still formed of a plurality of curvatures, such as the radius of curvature R21 and the radius of curvature R22.

Figure 21:
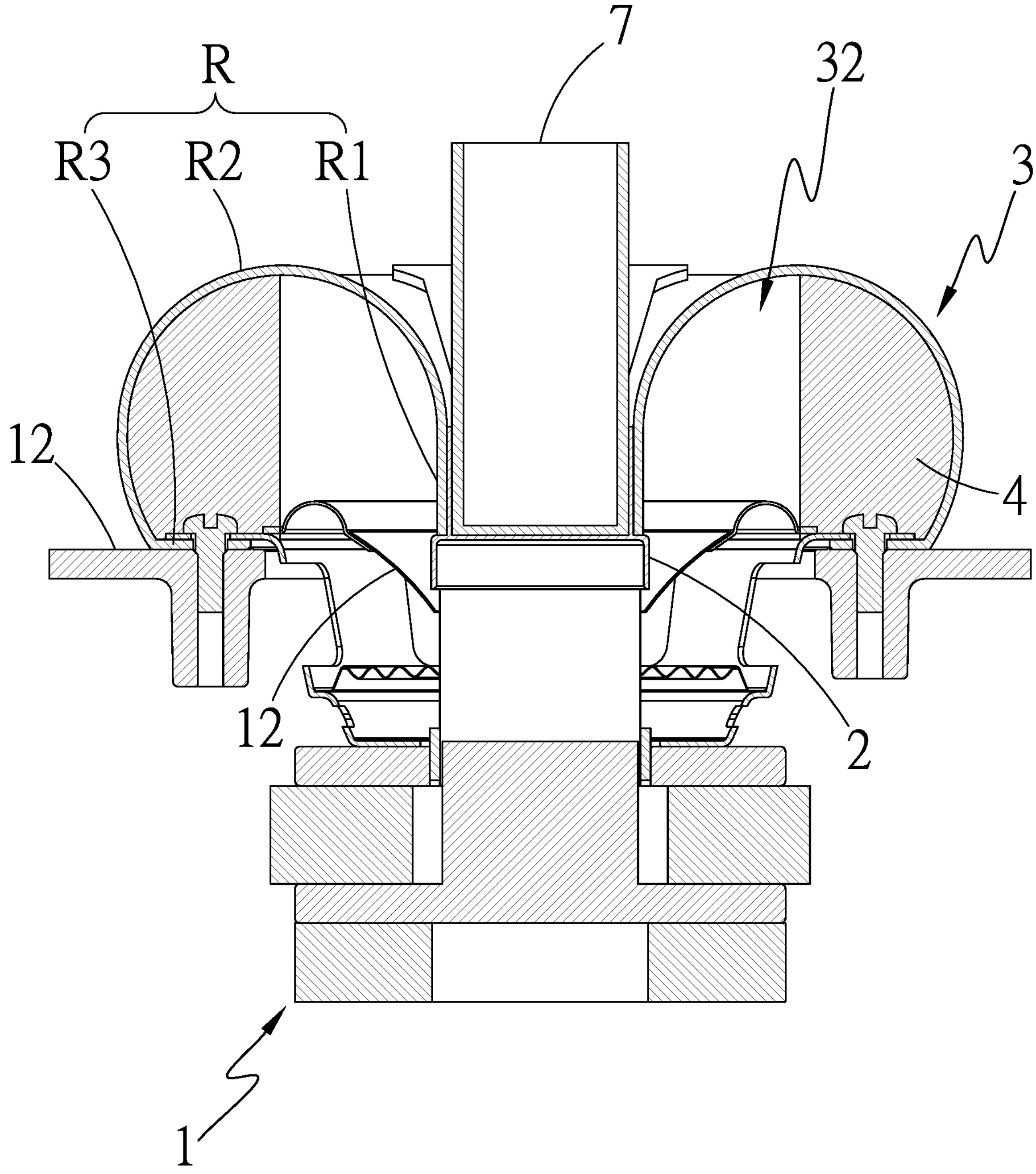
FIG. 21 is a cross-sectional view of a ninth embodiment of the present invention.

As shown in FIG. 21, it is clearly seen from the drawing that in the instant embodiment, the second vibration membranes 3 are also made in the form of a fan blade, and the first combining member 2 is made in the form of a ring, and a floating member 7 is arranged on the first combining member 2. The floating member 7 is machined to be located on the first combining member 2 or integrated with the first combining member 2 as a unit structure, and in the instant embodiment, being integrated as a unit structure is taken as an example for illustration and is capable of synchronously vibrating with the second vibration membranes 3. As such, the sound-generating element 1 is put into operation, the first combining member 2 works a movable end, while the frame portion 12 serves as a fixed end to allow the floating member 7 and the second vibration membranes 3 to vibrate synchronously.

Figure 22:
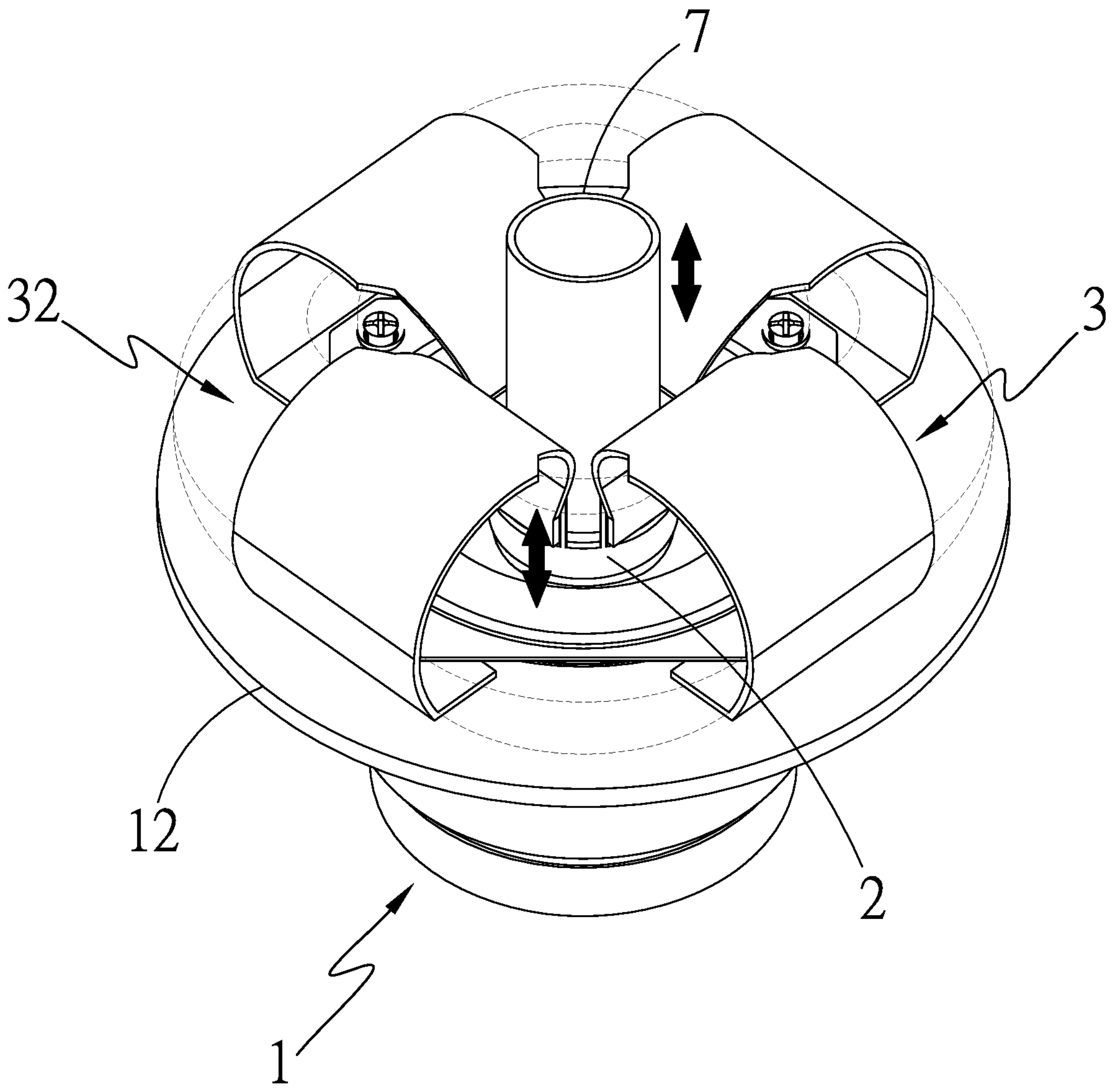
FIG. 22 is a schematic view illustrating a state of use of the ninth embodiment of the present invention.
Figure 23:
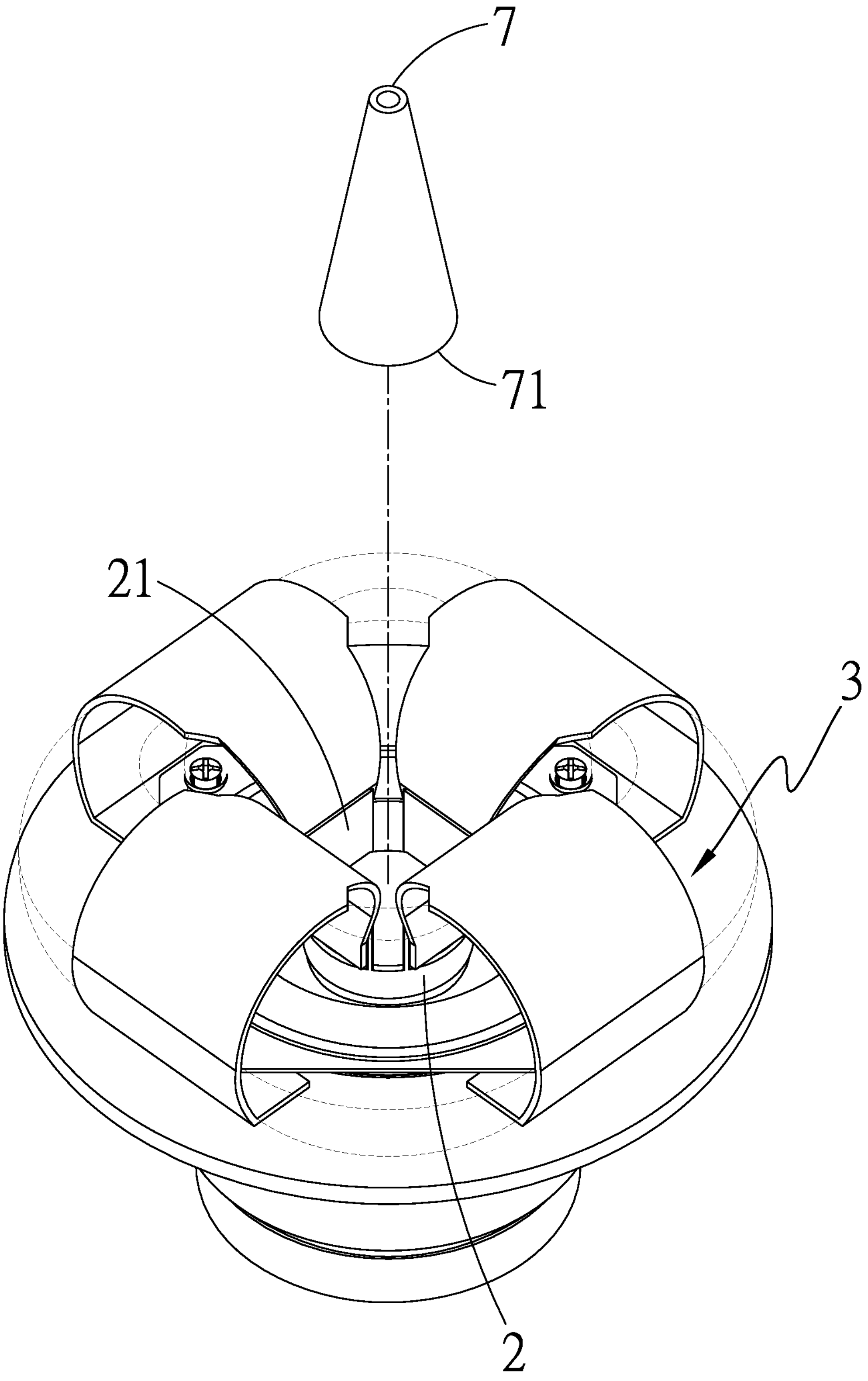
FIG. 23 is an exploded view of a tenth embodiment of the present invention.

As shown in FIG. 22, it is clearly seen from the drawing that a major difference of the instant embodiment from the previous embodiment is that the first combining member 2 is provided with a plurality of combining surfaces 21 to correspondingly combine with the second vibration membranes 3 and to be not parallel with the combining portions of the second vibration membranes 3 adjacent thereto, and the floating member 7 is of a narrow-top-wide-bottom conic configuration, and the bottom is provided with a combining ring 71, so that in the instant embodiment, the floating member 7 utilizes machining of the combining ring 71 for arranging on the first combining member 2, such as arranging in the form of adhering, fusing, tightening, or fitting, and since the floating member 7 is of a conic form, showing a relatively small contact area with respect to the first combining member 2, so that it only needs to ensure that, in mounting the first combining member 2, the combining ring 71 is securely combined with the first combining member 2, and there is no need to concern about structure clearances of other portions of the first combining member 2, assembling and mounting being made easy.

Thus, the key techniques that the structure of loudspeaker of the present invention may improve the prior art are as follows:

Firstly, the sound-generating element 1 is provided with both the first vibration membrane 11 and the second vibration membranes 3 so as to enhance the musicality of the low frequencies and also feature clarity of the middle and high frequencies, allowing most of the hearing impaired to hear more clearly and also exhibiting an advantage of size reduction.

Secondly, the arrangement of the combination curvature R and the spacing portions 31 of the second vibration membranes 3 makes the sound wave path wider to realize true surrounding sound effect and also generate a superimposition effect for the sound waves to make the sound more transmittable.

Thirdly, the sound-absorbing element 4 provides both a function of eliminating high-frequency shrill noise and an effect of supporting the second vibration membranes 3 to prevent deformation thereof.

Fourthly, a support element 5 that extends through the vibration space 32 is arranged on the sound-generating element 1 to more effectively provide a supporting effect to the combination curvature R of the second vibration membranes 3 and also to reduce the loading of the sound-absorbing element 4 for supporting to prevent deterioration of sound quality.

Fifthly, the first combining member 2 is provided with the stop portion 22 and the limiting portion 23 to easily determine an adhering position by using the limiting portion 23, so as to ensure that the size of each of the spacing portions 31 is the same and also to prevent the problems of positional shifting and shape changing resulting from the upward and downward movements of the second vibration membranes 3.

Sixthly, a shielding element is arranged on a top of the support element 5 to make only a horizontal radiating portion of sound of the sound-generating element 1 remaining and to prevent unnecessary echo or noise, making the present invention more suitable for applications of use in an indoor environment.

Seventhly, the combination curvature R of the second vibration membranes 3 has a great flexibility for variation and may be subjected to customized adjustment according to the user's demand for sound quality or according to the situation of the hearing impaired with respect to effective low frequency, in order to generate sound waves of various frequencies.

I claim:

1. A structure of loudspeaker, mainly comprising:

a sound-generating element, of which a surface comprises a first vibration membrane;

a first combining member, which is arranged on the sound-generating element and abuts a center of the first vibration membrane;

a plurality of second vibration membranes, ends of the second vibration membranes being circumferentially arranged on the first combining member, each of the second vibration membranes being curved to form multiple sections of a combination curvature, the combination curvature comprising a first curvature adjacent to the first combining member, at least one second curvature defined on one side of the first curvature that is away from the first combining member, and a third curvature defined on one side of the second curvature that is away from the first curvature;

wherein the first combining member comprises at least one combining surface to correspondingly combine with the second vibration membranes and not parallel with combining portions of the second vibration membranes adjacent thereto;

a plurality of spacing portions, which are defined between adjacent ones of the second vibration membranes;

a vibration space, which is formed by being surrounded by curving of the second vibration membranes;

wherein the sound-generating element comprises a support element that extends through the vibration space, and one end of the support element that is away from the sound-generating element is arranged for mounting ends of the second vibration membranes that are away from the first combining member; and a sound-absorbing element, which is arranged in an interior of the vibration space for noise reduction and supporting of the second vibration membranes.

* * * * *